Dec. 29, 1959

F. W. SCHREMP

VARIABLE LETTER SPACE AND MARGIN CONTROL MECHANISM FOR TYPEWRITERS 2,919,007

Filed Feb. 17, 1956

13 Sheets-Sheet 1

INVENTOR
FREDERICK W. SCHREMP

BY [signature]

ATTORNEY

Dec. 29, 1959 F. W. SCHREMP 2,919,007
VARIABLE LETTER SPACE AND MARGIN CONTROL
MECHANISM FOR TYPEWRITERS
Filed Feb. 17, 1956 13 Sheets-Sheet 2

INVENTOR.
FREDERICK W. SCHREMP
BY J. L. Sterling
ATTORNEY

Dec. 29, 1959 F. W. SCHREMP 2,919,007

VARIABLE LETTER SPACE AND MARGIN CONTROL MECHANISM FOR TYPEWRITERS

Filed Feb. 17, 1956 13 Sheets-Sheet 3

INVENTOR.
FREDERICK W. SCHREMP

BY Jh L Sterling

ATTORNEY

INVENTOR.
FREDERICK W. SCHREMP
BY
[signature]
ATTORNEY

Dec. 29, 1959 F. W. SCHREMP 2,919,007

VARIABLE LETTER SPACE AND MARGIN CONTROL MECHANISM FOR TYPEWRITERS

Filed Feb. 17, 1956 13 Sheets-Sheet 5

INVENTOR
FREDERICK W. SCHREMP
BY [signature]
ATTORNEY

Dec. 29, 1959 F. W. SCHREMP 2,919,007

VARIABLE LETTER SPACE AND MARGIN CONTROL MECHANISM FOR TYPEWRITERS

Filed Feb. 17, 1956 13 Sheets-Sheet 6

INVENTOR.
FREDERICK W. SCHREMP

BY John L. Sterling

ATTORNEY

INVENTOR.
FREDERICK W. SCHREMP
BY
[signature]
ATTORNEY

FIG. 12

| Lower Case | Units of Spacing | | UPPER CASE |
|---|---|---|---|
| aaaa | 3 | 4 | AAAA |
| bbbb | 3 | 4 | BBBB |
| cccc | 3 | 4 | CCCC |
| dddd | 3 | 4 | DDDD |
| eeee | 3 | 4 | EEEE |
| ffff | 2 | 4 | FFFF |
| gggg | 3 | 4 | GGGG |
| hhhh | 3 | 4 | HHHH |
| iiii | 2 | 2 | IIII |
| jjjj | 2 | 3 | JJJJ |
| kkkk | 3 | 4 | KKKK |
| llll | 2 | 4 | LLLL |
| mmmm | 5 | 5 | MMMM |
| nnnn | 3 | 4 | NNNN |
| oooo | 3 | 4 | OOOO |
| pppp | 3 | 4 | PPPP |
| qqqq | 3 | 4 | QQQQ |
| rrrr | 3 | 4 | RRRR |
| ssss | 3 | 3 | SSSS |
| tttt | 2 | 4 | TTTT |
| uuuu | 3 | 4 | UUUU |
| vvvv | 3 | 4 | VVVV |
| wwww | 4 | 5 | WWWW |
| xxxx | 3 | 4 | XXXX |
| yyyy | 3 | 4 | YYYY |
| zzzz | 3 | 4 | ZZZZ |
| §§§§ | 3 | 3 | ¶¶¶¶ |
| 2222 | 3 | 5 | @@@@ |
| 3333 | 3 | 3 | #### |
| 4444 | 3 | 4 | $$$$ |
| 5555 | 3 | 5 | %%%% |
| 6666 | 3 | 3 | ¢¢¢¢ |
| 7777 | 3 | 4 | &&&& |
| 8888 | 3 | 3 | **** |
| 9999 | 3 | 2 | (((( |
| 0000 | 3 | 2 | )))) |
| ----dash | 3 | 3 | underline ____ |
| ==== | 3 | 3 | ++++ |
| 1111 | 3 | 2 | !!!! |
| ;;;; | 2 | 2 | :::: |
| ''''--apostrophe | 2 | 3 | """" |
| ,,,,comma | 2 | 2 | comma--,,,, |
| ....period | 2 | 2 | period--.... |
| //// | 3 | 4 | ???? |

*INVENTOR.*
FREDERICK W. SCHREMP
*BY* J. L. Sterling
ATTORNEY

Dec. 29, 1959 F. W. SCHREMP 2,919,007

VARIABLE LETTER SPACE AND MARGIN CONTROL MECHANISM FOR TYPEWRITERS

Filed Feb. 17, 1956 13 Sheets-Sheet 9

INVENTOR
FREDERICK W. SCHREMP
BY J. L. Sterling
ATTORNEY

INVENTOR
FREDERICK W. SCHREMP
BY
ATTORNEY

INVENTOR
FREDERICK W. SCHREMP
BY [signature]
ATTORNEY

Dec. 29, 1959

F. W. SCHREMP

VARIABLE LETTER SPACE AND MARGIN CONTROL MECHANISM FOR TYPEWRITERS 2,919,007

Filed Feb. 17, 1956

13 Sheets-Sheet 12

INVENTOR
FREDERICK W. SCHREMP
BY Jh L Sterling
ATTORNEY

INVENTOR
FREDERICK W. SCHREMP

BY [signature]
ATTORNEY 2,919,007

VARIABLE LETTER SPACE AND MARGIN CONTROL MECHANISM FOR TYPEWRITERS

Frederick W. Schremp, Stamford, Conn., assignor to Sperry Rand Corporation, New York, N.Y., a corporation of Delaware Application February 17, 1956, Serial No. 566,197

21 Claims. (Cl. 197—84)

This invention relates generally to typewriters and like key-operated printing machines and more specifically to improvements in such machines wherein the paper carriage is moved variable extents proportional to the widths of the characters typed.

The purpose of the invention is to provide an improved and simplified variable spacing mechanism for the paper carriage of typewriters and like machines which is more accurate and reliable than prior variable spacing mechanisms; which is capable of selectively effecting a variety of paper carriage movements that differ from one another by a very small degree; which provides for varying the paper carriage movements, in letter spacing direction, in accordance with the widths of both upper and lower case characters; a variable spacing mechanism that can be used for either power operated or manually operated typewriters with a minimum of changes in the design of existing machines; a variable spacing mechanism that requires a minimum of power for its operation and which is extremely fast, accurate, and highly reliable; which is designed to cooperate smoothly and effectively with other mechanisms associated with the paper carriage of a typewriter such as the tabulating, backspacing, case shifting, space bar, and margin controlling mechanisms; and a variable spacing mechanism wherein a wide range of peripheral entry of the escapement sector into the escapement gear is provided for thus insuring positive and accurate arresting of the paper carriage after letter spacing, tabulating, and back spacing operations.

Another object of the invention is to provide for accurate control of the left hand margin position in combination with the variable spacing means and to provide variable spacing means so that justification of the right margin of typing can be accomplished.

Other objects of the invention will be pointed out in the following description and claims, and illustrated in the accompanying drawings, which disclose, by way of example only, the principle of the invention and the best modes, which have been contemplated, of applying that principle.

In the drawings;

Fig. 12 is a chart showing the units of escapement movement imparted to the carriage for each letter or character designated in the chart.

Figure 1:
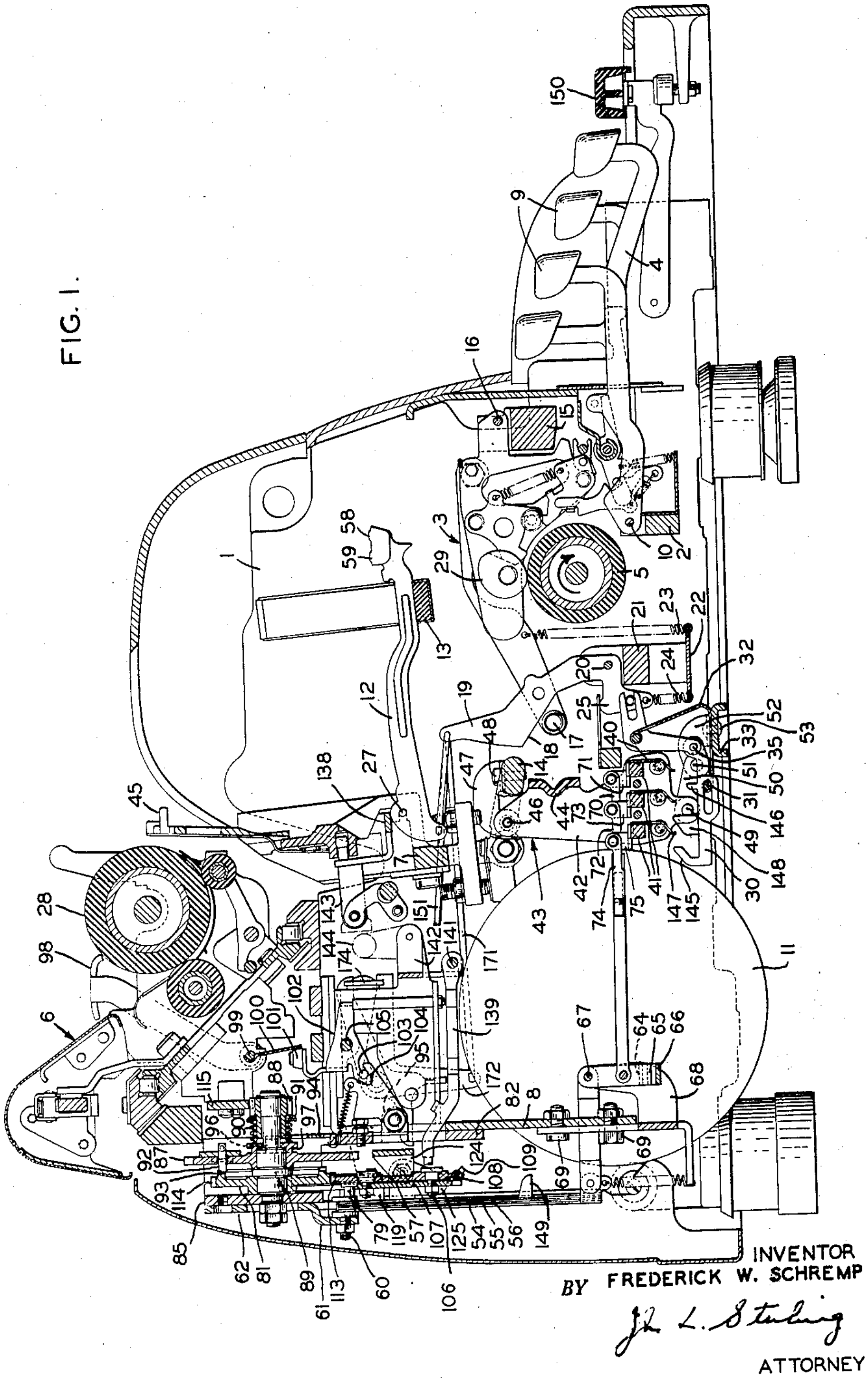
Fig. 1 is a view, partly in section and partly in side elevation of a Remington typewriter, taken at substantially the center of the machine where the types strike against the platen, and showing the present invention applied to the escapement mechanism which controls variable carriage movement.

This application is a continuation-in-part of application Serial No. 360,511 filed June 9, 1953, in the name of Frederick W. Schremp, which application is now abandoned.

The present invention is described and shown in the accompanying drawings as applied to a Remington typewriter, more specifically known as the Remington class 250 power operated typewriter. However, it will be understood that the invention is not limited in its application to the specific machine selected for purposes of illustration but may be applied equally well to other typewriters whether manually or power operated.

The typewriter mechanism, with the exception of certain parts illustrated in this application, is substantially similar to the structure shown in Patent Numbers 2,289,531 July 14, 1942; 2,304,216 December 8, 1942; 2,326,312 August 10, 1943; and United States application Serial Number 101,450 filed June 25, 1949, now Patent No. 2,638,199 in view of which only a very brief general description will be given of the machine such as will enable the present invention to be readily understood and practiced.

Portions of a Remington typewriter such as shown in the above mentioned patents and patent application are illustrated in the drawings and include spaced parallel side frames 1 which are connected at desired points by transversely extending plates and bars, one of which is a cross bar 2 shown in section in Fig. 1 and others of which will be later described. These side frames 1 support the principal operating mechanisms of the typewriter such as the power arms 3, key levers 4, power roll 5, paper carriage 6, etc. Numeral 7 designates the conventional type segment which is mounted for vertical movement in guides carried by the side frames 1 to provide for case shifting between upper and lower case characters, in a manner substantially similar to that shown in Patent No. 2,289,531. The side frames 1 are further connected to one another at the rear of the machine by the frame back plate 8 shown in section in Fig. 1 and in rear elevation in Fig. 3. The variable escapement mechanism for the paper carriage is mounted on plate 8 as will presently appear.

Each key lever 4 has a character key 9 and its rearward end is pivoted on a shaft 10, which is supported by the side frames 1 and cross bar 2, as clearly illustrated in the sectional view Fig. 1.

The power roll 5 is rotatably journaled in suitable bearings carried by the side frames 1 and, when the machine is in use, is continuously rotated in the direction indicated by the arrow in Fig. 1 by means of a suitable motor 11 in any conventional and well known manner.

Figure 2:
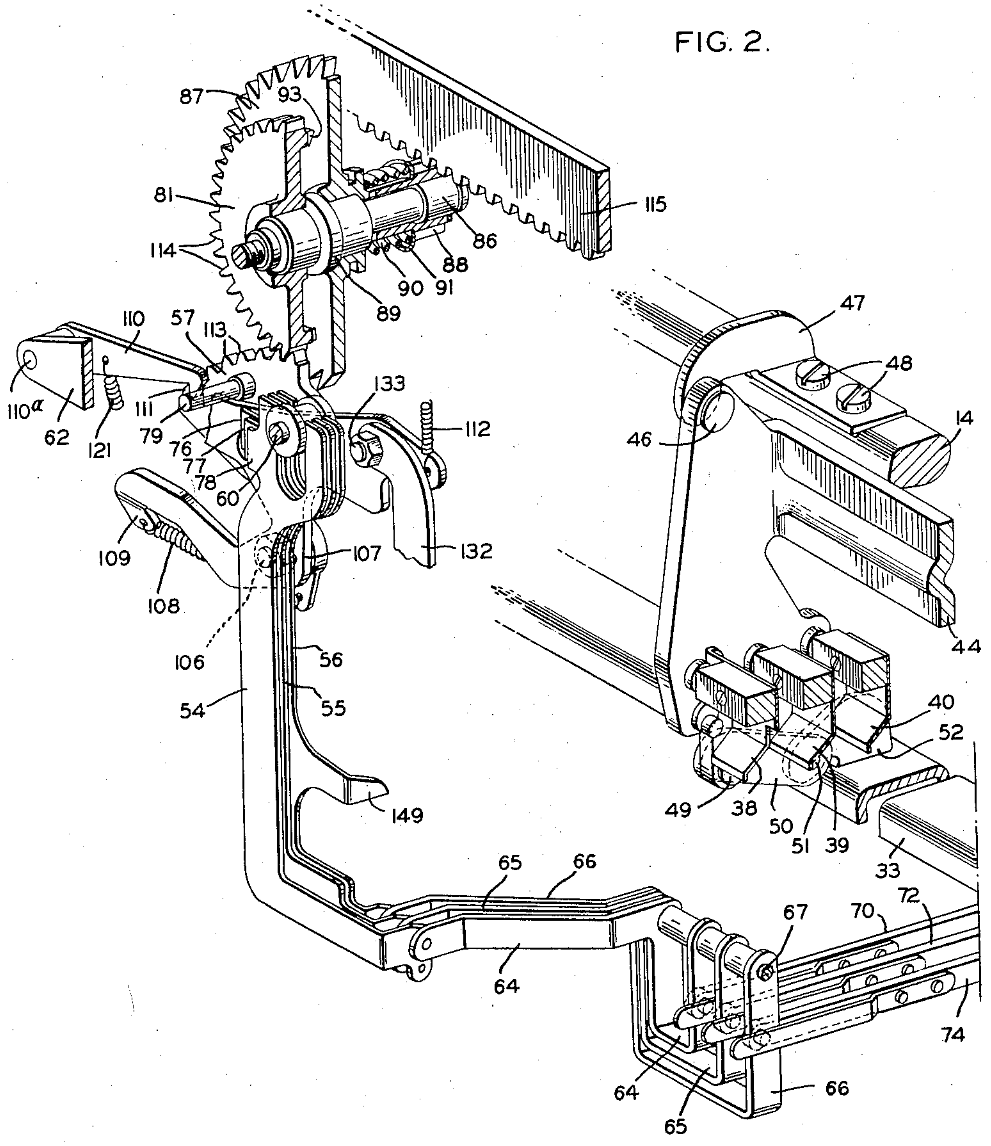
Figs. 2 and 2A are complementary halves showing a fragmentary perspective illustrating the variable spacing mechanism and showing only three type actions and their associated permutation bars.

A plurality of type bars 12 are pivotally mounted in type segment 7, only three central type bars 12 being illustrated in Fig. 2 with the associated operating mechanism for each of these type bars. The usual type bar cushion 13 is suitably mounted on arms carried by and movable with type segment 7 for supporting the type bars in the position of rest which is the position illustrated in Figs. 1 and 2. A transversely extending shaft 14 is rotatably mounted between the spaced side frames 1 and forms part of the segment case shifting mechanism.

Fulcrum bar 15 is mounted in front of power roll 5 and is formed with a plurality of transversely spaced parallel slots in the upper edge for receiving and pivotally mounting the plurality of power arms 3 in spaced parallel relation on pivot rod 16, the latter mounted on the fulcrum bar. As will be clear from Figs. 1 and 2 all of the power arms 3 extend rearwardly in transverse relation above the power roll 5 and each power arm has a roller 17 mounted on the free rear end for engagement with a cam surface 18 on its corresponding type bar bell crank 19. Each bell crank 19 is pivotally mounted on a rod 20 carried by bar 21 extending transversely across the lower portion of the typewriter and secured at opposite ends to said side frames 1.

An anchor plate 22 is mounted on the lower edge of bar 21 to provide an anchor along the front edge for power arm operating springs 23, one for each power arm 3. One end of each spring 23 is anchored to plate 22 and the opposite end to the rear of power arm 3 for normally moving the power arms downwardly toward said power roll about their pivots on rods 16. The rear edge of anchor plate 22 provides an anchor for one end of bell crank operating springs 24 having the opposite ends attached to rearwardly and downwardly extending arms 25 on bell cranks 19. Springs 24 normally urge bell cranks 19 in a counterclockwise direction, as shown in Figs. 1 and 2. A plurality of type bar operating links 26 each have one end pivotally secured to the upper end of an associated bell crank 19 and the opposite end pivotally secured to the heel of an associated type bar 12. The type bars 12 are pivotally secured on pivot rod 27 carried by the type segment 7. Type bars 12 are arranged in arcuate array in the usual manner on type segment 7 for pivotal movement upon rod 27 to have printing engagement with platen 28 (Fig. 1) in the center position and aligned by the usual type guide 45 in a manner now well understood in the art. A rotatably mounted eccentric 29 is provided for each power arm 3 for cooperation with the power roll 5 upon depression of its corresponding key lever 4 in a manner fully set forth in application Serial No. 101,450 above referred to.

From the foregoing description it will now be understood that during operation of the typewriter, manual depression of a key lever 4 will engage eccentric 29 with the continuously rotating power roll 5 to move its power arm 3 clockwise on pivot rod 16, which in turn, through roller 17, rocks type bar bell crank 19 clockwise on pivot rod 20. Rocking movement of bell crank 19 in turn, through link 26, rocks type bar 12 counterclockwise (Fig. 1) on its pivot rod 27 for printing a character on paper placed about the platen 28 in the conventional and well known manner.

In conventional typewriters the paper carriage is moved a uniform distance in letter spacing direction (usually $\frac{1}{10}$ of an inch for pica type) after each character is typed and such carriage movement is under the control of an escapement mechanism that is operated each time a key lever or the space bar is depressed. However, in variable spacing typewriters, paper carriage movements in letter spacing direction are selectively varied in proportion to the widths of the characters typed.

In describing the variable spacing mechanism made according to the present invention the indexing or space selecting mechanism for paper carriage movement, and its cooperation with the type actions, will be described first. This mechanism is illustrated in Figs. 1 and 2 and is largely mounted beneath and to the rear of power roll 5 and is operated by the type bar bell cranks 19. As shown in Fig. 1, a plurality of transversely spaced permutation slides 30, one for each type action, are slidably mounted upon a transverse rod 31 carried by the rearwardly extending leg of a substantially V-shaped bracket 32 and the bracket is mounted upon and secured to cross bar 33 opposite ends of which are attached to the side frames 1. Fore and aft sliding movement is imparted to the permutation slides 30 through bell crank levers 34, the lower ends of which are pivotally connected at 35 to the forward ends of said slides and the forwardly extending bifurcated ends of which cooperate with rollers 36 projecting sidewardly from arms 25 of bell cranks 19. The bell crank levers 34 are pivotally carried by a transverse rod 37 mounted in the upwardly extending leg of bracket 32.

It will now be observed that each time a type bar bell crank 19 is rocked clockwise on its pivot shaft 20 (Figs. 1 and 2) by its associated power arm 3 through roller 17, the corresponding permutation slide 30 will be drawn forwardly in the machine upon rod 31 through counterclockwise movement of its corresponding bell crank lever 34. Forward movement of the permutation slides 30 is utilized to selectively impart counterclockwise rotation to a plurality of transversely extending permutation bails 38, 39 and 40 respectively, in a manner later described. Each bail is fastened to and projects downwardly from a transverse bar 41 opposite ends of which bars are pivotally mounted in spaced parallel end plates 42 of a permutation bail carrier bracket 43. The end plates of the carrier bracket are connected to one another by a tie bar 44.

During a case shifting operation of the typewriter, shaft 14 is rocked counterclockwise as viewed in Fig. 1, to move type segment 7 from its upper, or lower case type position, to its lower, or upper case type position, in the conventional manner. This rocking movement of shaft 14 is utilized to lower and raise permutation bail carrier bracket 43 to change the relation of the permutation bails 38, 39 and 40 respectively relative to the permutation slides 30 for reasons presently appearing. To this end the upper ends of plates 42 are pivotally attached at 46 to arms 47 mounted upon and secured to shaft 14 by screws 48. The lower ends of said plates are pivotally connected at 49 to the rearward ends of short links 50 and the forward ends of such links are pivotally connected at 51 to a similar pair of arms 52 which are mounted upon and secured to cross bar 33 by rivets 53 as best shown in Fig. 1.

In the present embodiment of the invention there are three increment indexing spacers 54, 55 and 56, respectively, which will be referred to hereinafter as sector stop bars. These stop bars are selectively elevated to limit clockwise rotation of a movable sector or escapement gear segment 57 in a manner to impart variable movements to paper carriage 6, which movements are proportional to the widths of the characters printed by the two types 58 and 59 comprising upper and lower case characters carried by each type bar 12. The upper slotted ends of sector stop bars 54, 55 and 56 respectively are guided for vertical movement by stud 60 mounted in an offset depending arm 61 formed integral with the escapement rocker bracket 62. The lower ends of stop bars 54, 55 and 56 are pivotally connected to the rearwardly extending legs of bell crank levers 64, 65 and 66 respectively as clearly shown in Fig. 2. The bell crank levers are rotatably supported upon a horizontal shaft 67 carried by bracket 68, the latter being securely fastened to the frame back plate 8 by bolts 69.

The downwardly extending leg of bell crank lever 64 is connected to permutation bail 40 through an adjustable link 70 the rearward end of which is pivotally connected with said bell crank lever 64 and the forward end pivotally connected to a bracket 71 mounted upon pivoted bar 41, of bail 40, as best shown in Fig. 2. Similarly, the downwardly extending leg of bell crank lever 65 is connected to permutation bail 39 through an adjustable link 72 having its rear end pivotally connected with said bell crank lever 65 and its forward end pivotally connected to a bracket 73 mounted upon the pivoted bar 41 of bail 39. The downwardly extending leg of bell crank lever 66 is likewise connected to permutation bail 38 by an adjustable link 74 having its rearward end pivotally connected to the bell crank lever 66 and its forward end pivotally connected to a bracket 75 mounted upon the pivot bar 41 of bail 38. It will now be obvious that counterclockwise rocking of bails 38, 39 and 40 (Figs. 1 and 2) will, in turn, elevate the stop bars 56, 55 and 54 respectively, to position the vertical working edges of lugs 76, 77 and 78, respectively, of said bars into the path of pin 79 which projects rearwardly from escapement gear segment 57 when the latter is released for clockwise rotation in a manner hereinafter disclosed. It should be noted at this point that the vertical edges of lugs 76, 77 and 78 are located at varying distances from the normal position of pin 79 to selectively vary angular movement of gear segment 57 depending upon which stop bar is elevated. For example, when bail 38 is rocked counterclockwise, stop bar 56 will be elevated to move the vertical edge of its lugs 76 into the path of pin 79. Similarly, rocking movement of bail 39 elevates stop bar 55 to bring the vertical edge of its lug 77 into the path of the pin 79, and rocking movement of bail 40 elevates stop bar 54 to position the vertical edge of its lug 78 into the path of pin 79.

It will be understood from Fig. 3 that lugs 76, 77 and 78 of stop bars 56, 55 and 54 respectively, are normally below the path of travel of pin 79 and when none of the stop bars are elevated, pin 79 limits against the vertical edges 80 of said bars for greatest travel of the escapement gear segment 57 when it is withdrawn from meshing engagement with the escapement gear 81.

Figure 4:
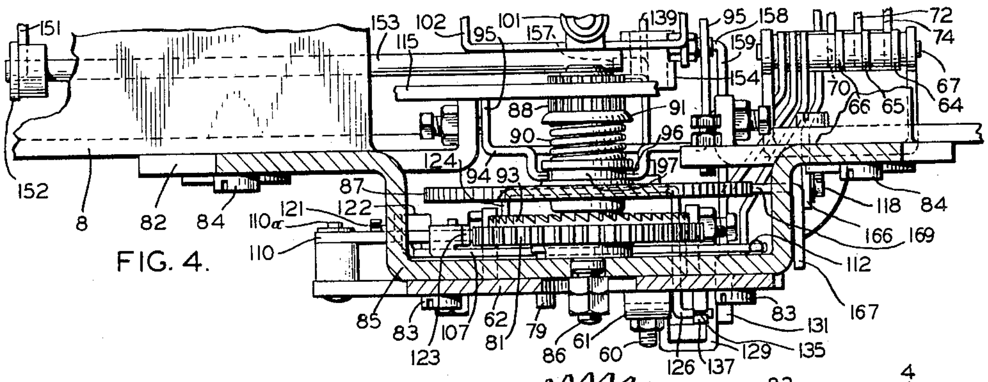
Fig. 4 is a sectional plan taken substantially along the line 4—4 of Fig. 3.

Attention is now directed particularly to Figs. 1, 3, 5 and 6 for a detailed description of the escapement means employed for moving the paper carriage 6 distances proportional to the widths of the characters printed by the types 58 and 59. The escapement bracket 62 (Fig. 3) previously referred to is suitably mounted upon a supporting bracket 82 and secured thereto by shoulder screws 83. Bracket 82 in turn is mounted upon the rear surface of frame back plate 8 by screws 84 as clearly shown in Fig. 3. The central offset portion 85 of bracket 82 (Figs. 1 and 4), carries a horizontally disposed shaft 86 upon which an escapement gear 81, back space ratchet wheel 87 and escapement wheel pinion 88 are rotatably journaled. As shown in Figs. 1 and 4, the hubs of back space ratchet wheel 87 and escapement wheel pinion 88 are splined or keyed for axial movement relative to one another and the hub of wheel 87 is normally urged against a stop 89, formed on shaft 86 by spring 90. The rearward end of spring 90 bears against the hub of back space ratchet wheel 87 while the forward end bears against a flanged washer 91 which in turn bears against the hub of pinion 88. Dog 92, pivotally mounted within ratchet wheel 87, normally meshes with gear teeth 93 formed on the front face of escapement gear 81 and the construction is such that clockwise rotation of wheel 87 (as viewed in Figs. 3, 5 and 6) is controlled by clockwise rotation of escapement gear 81 except when dog 92 is withdrawn or disengaged from ratchet teeth 93 by sliding wheel 87 upon shaft 86 toward pinion 88 as is the case during tabulating or carriage release operations in a manner presently made clear.

Axial movement of back space ratchet wheel 87, upon shaft 86, is under the control of carriage release yoke 94 and the yoke is pivotally supported between forwardly extending ears 95 formed integral with the supporting bracket 82. The upwardly extending forked end 96 of yoke 94 fits within an annular groove 97 formed in the hub of back space ratchet wheel 87. It will now be appreciated that upon clockwise rocking of yoke 94 (as viewed in Fig. 1), its forked end 96 will shift wheel 87 forwardly on shaft 86 toward pinion 88 thus compressing spring 90 and disengaging dog 92 from ratchet teeth 93.

For manual carriage release, yoke 94 is rocked clockwise by the conventional carriage release levers 98 which levers are located at opposite ends of paper carriage 6. These release levers 98 are fast on a transverse shaft 99 which is rotatably mounted upon the carriage. Also fixed for rotation with shaft 99 is a bail 100 that cooperates with roller 101 mounted upon one arm of a pivoted lever 102. Pin 103, projecting sidewardly from another arm of lever 102, cooperates with a slot 104 in yoke 94. It follows therefore that upon rocking either release lever 98 forwardly, or in a clockwise direction as viewed in Fig. 1, bail 100 will engage roller 101 thus rocking lever 102 counterclockwise upon its pivot shaft 105, which in turn through pin 103 rocks yoke 94 clockwise to thereby disengage or withdraw dog 92 from ratchet teeth 93 as above described.

Figure 3:
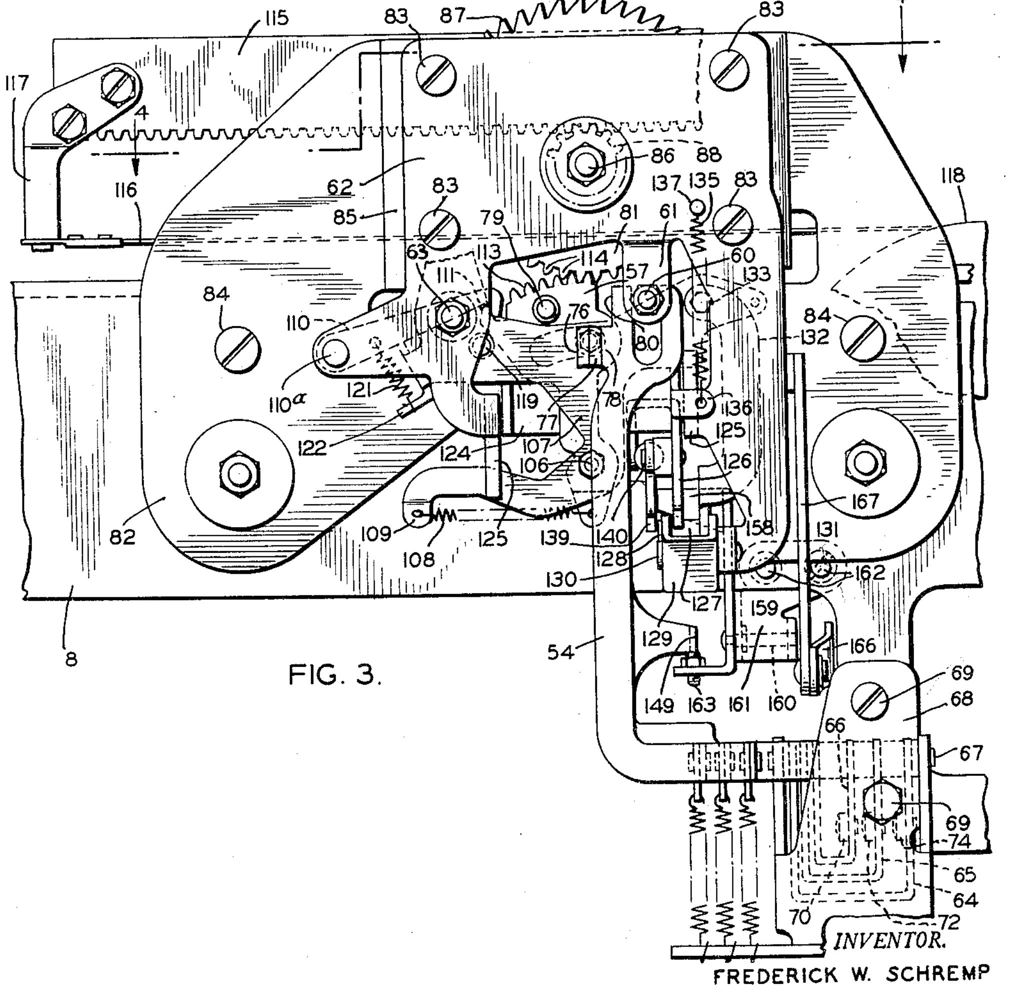
Fig. 3 is a rear elevation of the carriage variable escapement mechanism according to the present invention, the parts being shown in normal position.
Figures 5, 6:
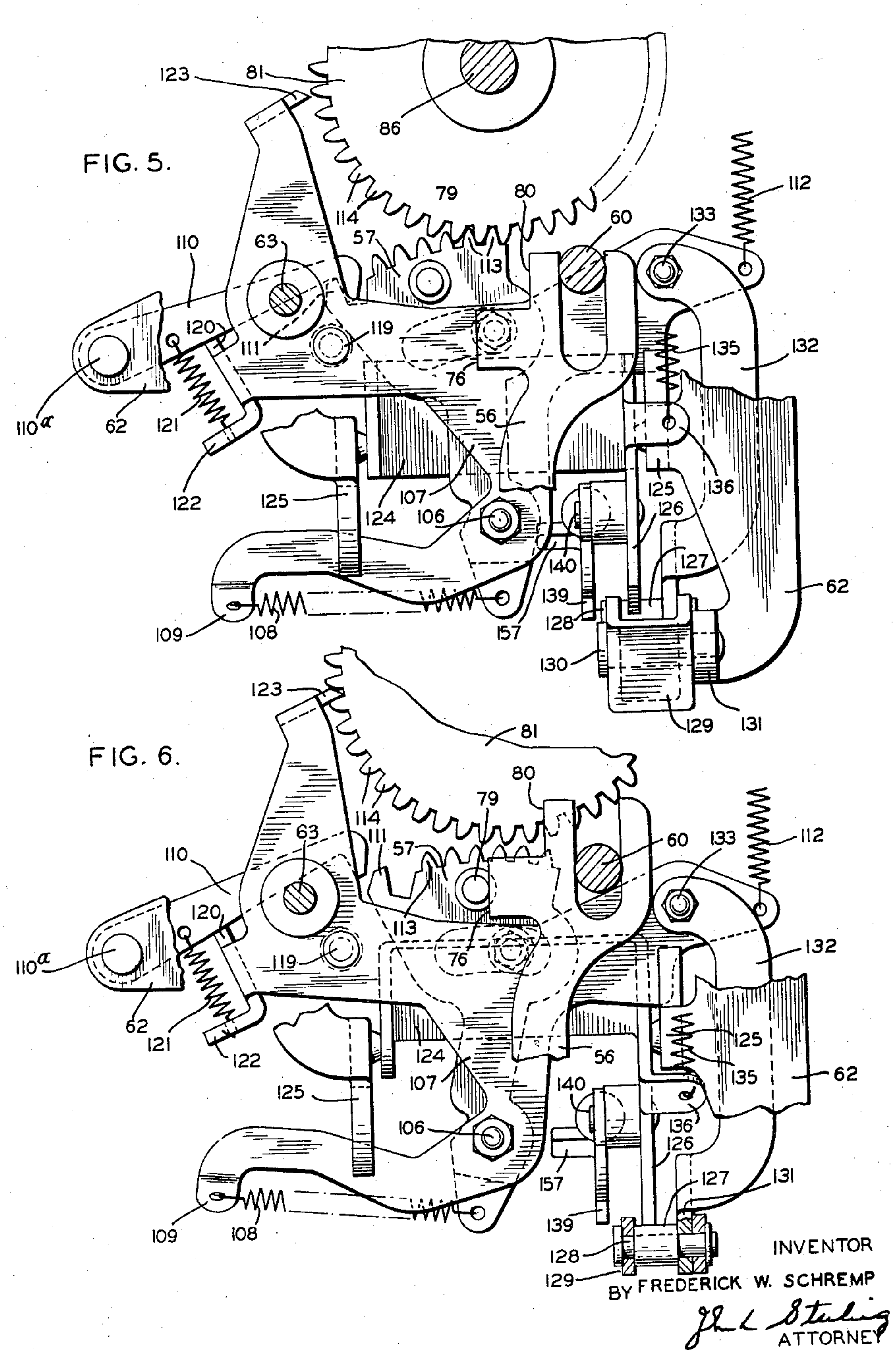
Fig. 5 is an enlarged rear elevational view of the escapement mechanism similar to Fig. 3 with parts omitted and showing the escapement sector and escapement gear in normal position.
Fig. 6 is a view similar to Fig. 5 but showing the escapement sector disengaged from the escapement gear and displaced an extent equal to two units of space.

As more clearly shown in Figs. 3 and 5, escapement gear sector 57 is pivoted upon a stud 106 mounted in the detent lever or sector carrier 107 and a spring 108, having one end anchored in the lower end of sector 57 and its other end anchored to the end of arm 109 formed integral with said carrier 107, urges the gear sector clockwise on its pivot 106 when the nose of latch 110 is lifted free of tooth 111 and sector 57 is withdrawn from meshing engagement with gear 81. Sector carrier 107 is pivoted upon a stud 63, mounted in bracket 62, and is normally urged to rock counterclockwise upon its pivot 63 by spring 112 to mesh teeth 113 of the sector with teeth 114 of escapement gear 81. The teeth of the conventional paper carriage rack 115 are in permanent mesh with the teeth of pinion 88 and the carriage 6 is drawn to the left in the machine for letter spacing, or to the right as viewed in Fig. 3, by the usual tape 116 attached at one end to an arm 117 fastened to rack 115 and having its other end wound upon the usual spring drum 118. Thus sector 57 is normally held against stud 119, which extends forwardly from carrier 107, under the tension of the spring drum 118. As shown in Figs. 3, 5 and 6, latch 110 is pivoted upon a stud 110a mounted in bracket 62 and is yieldably held against an ear 120, formed on carrier 107, by spring 121 one end of which is anchored to the latch and the other end to an ear 122 also formed on carrier 107.

It will now be clear that when carrier 107 is rocked clockwise on its pivot 63, sector 57 will be withdrawn from meshing engagement with escapement gear 81 and ear 120 will elevate latch 110 to withdraw its nose from blocking position relative to tooth 111 of sector 57. When sector 57 is free of gear 81, spring 108 rocks the sector clockwise until its pin 79 is arrested by one or all of the stop bars 54, 55 or 56 in the manner heretofore explained. As the teeth 113 of sector 57 are withdrawn from meshing engagement with the teeth 114 of escapement gear 81, through clockwise movement of carrier 107, fixed dog 123 formed integral with carrier 107 is moved into mesh with said gear 81 thereby preventing travel of the paper carriage in letter spacing direction during the time sector 57 is free from gear 81.

It is now obvious that when carrier 107 is restored or rocked counterclockwise in Fig. 6, sector 57 will be elevated and returned to meshing engagement with gear 81 while dog 123 is being withdrawn from holding engagement with said gear. When dog 123 is free from gear 81, sector 57 is fully meshed with said gear and the paper carriage 6 is then drawn in letter spacing direction by spring drum 118 through tape 116 until counterclockwise rotation of sector 57 is stopped by stud 119.

The means for rocking carrier 107 about its pivot 63 to engage and disengage the escapement sector 57 and dog 123 with respect to escapement gear 81 will now be described. Again referring to Figs. 5 and 6 an escapement rocker 124 is mounted for pivotal movement between a pair of parallel ears 125 bent forwardly from bracket 62 and the lower edge of arm 126 (Figs. 6 and 9) of this escapement rocker forms a cam which cooperates with roller 127 journaled on shaft 128 mounted in the free ends of follower arm 129. The follower arm 129 is mounted for rocking movement on a stud 130 carried by an ear 131 bent rearwardly from the lower end of bracket 62. Rocking motion of follower arm 129 imparts rocking motion to sector carrier 107 through a link 132, which link has its lower end pivoted upon shaft 128 and its upper end pivoted upon stud 133 mounted on sector carrier 107. Roller 127 is normally engaged within notch 134 of arm 126 by a spring 135, one end of which is anchored to an ear 136 on said escapement rocker and the other end anchored to a stud 137 projecting rearwardly from bracket 62, as clearly shown in Fig. 3.

Upon depression of any key lever 4 escapement rocker 124 is operated by the usual type bar universal bar 138 through an adjustable link 139. The rearward end of link 139 is pivoted upon stud 140 projecting sidewardly from arm 126 of rocker 124 and the forward end pivoted upon stud 141 projecting sidewardly from an ear formed with universal bar oscillator 142. As shown in Fig. 1 the usual rearwardly extending arm 143 of type bar universal bar 138 cooperates with a stud 144, on oscillator 142, when the bar 138 is moved rearwardly (or to the left in Fig. 1) by any of the type bars 12 thus rocking oscillator 142 counterclockwise and drawing link 139 forwardly. This forward movement of link 139 in turn rocks escapement rocker 124 counterclockwise on its pivots which in turn rocks follower arm 129 in the manner previously described.

It will now be understood that for each excursion or flight of a type bar 12, escapement gear segment 57 will be disengaged from and subsequently engaged with gear 81 and dog 123 will be simultaneously engaged with and subsequently disengaged from said gear to permit segment 57 to rock clockwise (Fig. 8) variable extents depending upon the setting of the stops 54, 55 and 56.

In the present machine the unit selected for carriage spacing is of the order of .03215 and the typed characters are spaced amounts varying from two to five units. It is to be noted, however, that the selected unit spacing of .03215 for the paper carriage is purely arbitrary and may readily be changed, should this be desired, by simply changing the pitch diameter and gear teeth of pinion 88 and the pitch and teeth of carriage rack 115 to establish different unit spacing without requiring any change in the permutation or escapement mechanism as disclosed in the present invention.

In the present invention four different spacings are provided for the carriage thus accommodating four different widths of letters to be printed, but it will be understood that more or less carriage spacings may be employed without departing from the present invention.

Figure 2A:
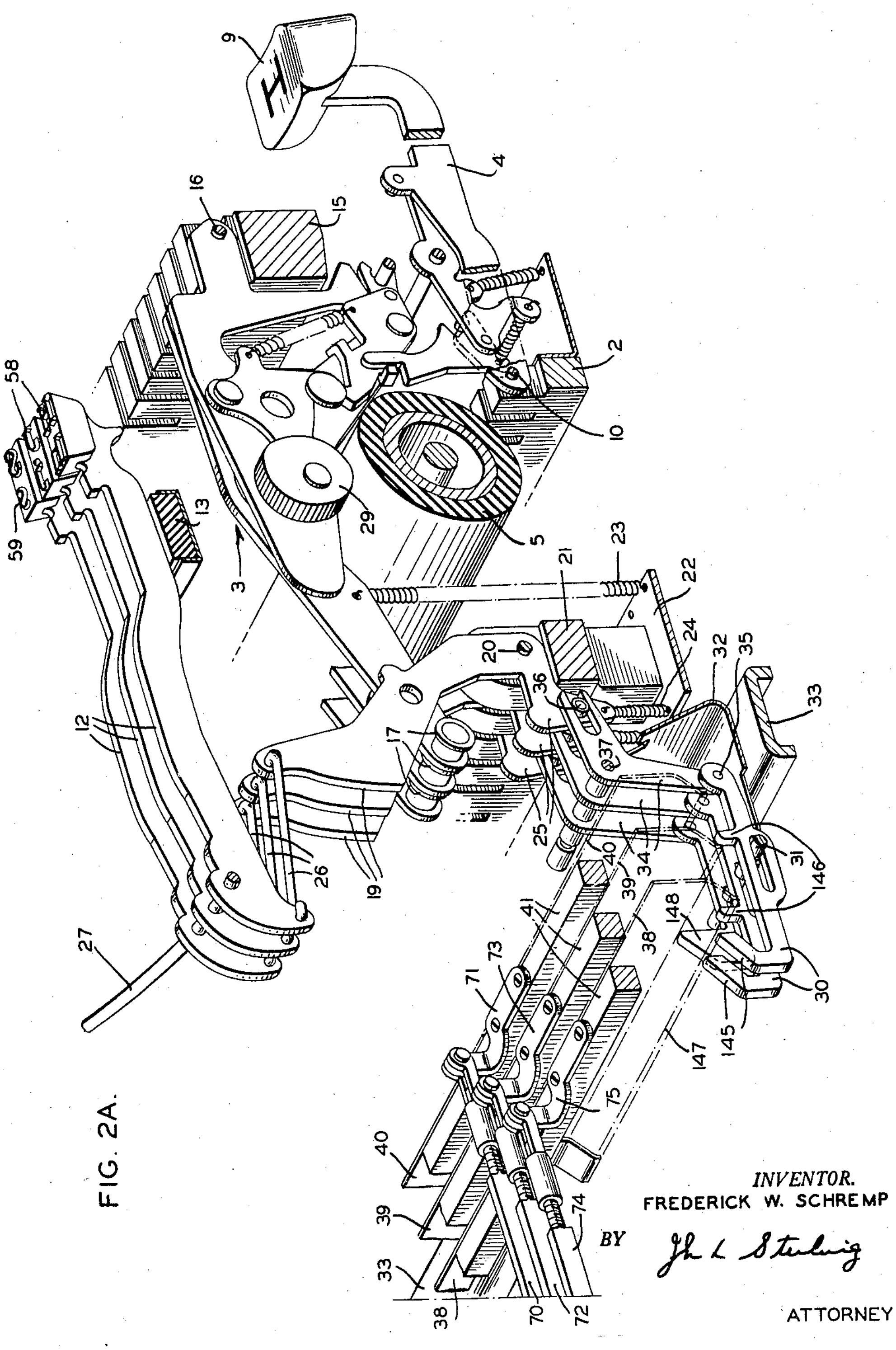
Figure 10:
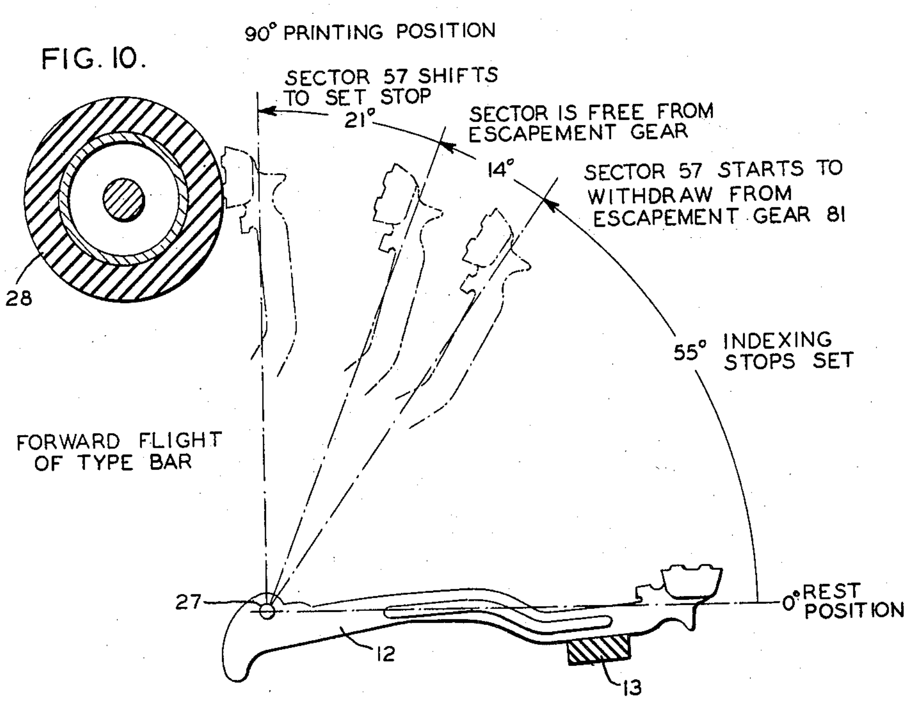
Fig. 10 is a diagrammatic side elevational view showing forward flight of one of the type bars and the timing of the escapement mechanism during such flight.

Attention is now directed to the chart shown in Fig. 10 from which it will be observed that only certain characters require alteration in carriage spacing and that the majority of lower case characters require but three units of space while the majority of upper case characters require four units of space. As previously mentioned, all typing key type actions, with the exception of the type action for typing key "M," have a corresponding permutation slide 30 and all of these slides cooperate with the bails 38, 39 and 40 to elevate the stops 54, 55 and 56 respectively. Three such permutation slides are illustrated in Fig. 2. Eight different permutation slides are required to accommodate the eight different spacing combinations shown in the chart. For example, lower case "a" requires three units of space while upper case "A" requires four units, lower case "t" two units and upper case "T" four units, lower case "w" four units, upper case "W" five units, etc. This spacing is accomplished by properly located lugs on the permutation slides as will now be explained in connection with the typing key for the letter "L." As shown in Fig. 2A permutation slide 30 for key "L" is provided with two lugs 145 and 146, lug 145 being located on the slide to cooperate with bail 38 only when the type segment 7 is in lower case type position, and lug 146 being dimensioned and so located on the slide as to cooperate only with bail 40, when said type segment is shifted to upper case type position. Accordingly when type segment 7 is in lower case type position, depression of the "L" key lever 4 will cause its corresponding permutation slide 30 to be drawn forwardly in the machine and lug 145 will then engage and rock bail 38 in a manner to elevate stop bar 56. This positions the vertical working edge of lug 76 into the path of pin 79 on escapement gear segment 57. It follows that gear segment 57, when rocked clockwise on its pivot 106 after being withdrawn from meshing engagement with gear 81, is arrested when pin 79 engages the working edge of lug 76. Upon re-engagement of sector 57 with gear 81 the paper carriage will then travel two units in letter spacing direction before sector 57 comes to rest against stud 119.

By proper location of the lugs 145 and 146 along the upper edge of permutation slides 30, any of the eight spacing combinations shown in the chart of Fig. 10 may be obtained. It will be noted from Figs. 1 and 2 that all lower case lugs 145, on slides 30, are cut away to clear the offset portion 147 of the bails 38, 39 and 40 when the type segment 7 is shifted to upper case type position. Similarly, all upper case lugs 146 are dimensioned to ride beneath said offset portion of the bails when the type segment 7 is shifted to lower case type position as will be clear from Figs. 1 and 2. In the event the same unit spacing is required for both upper and lower case characters, such for example as the letters "I" and "S," the upper and lower case lugs 145 and 146 may be combined into a single lug 148 as shown in Fig. 2A, and by dotted lines in Fig. 1.

The speed and accuracy with which the improved escapement mechanism operates is, to a large extent, due to the timing of the various mechanisms controlled by the flight of the type bars 12 and the indexing mechanism controlled by the type action power arms. For a better understanding of this timing, attention is directed to Figs.

Figure 11:
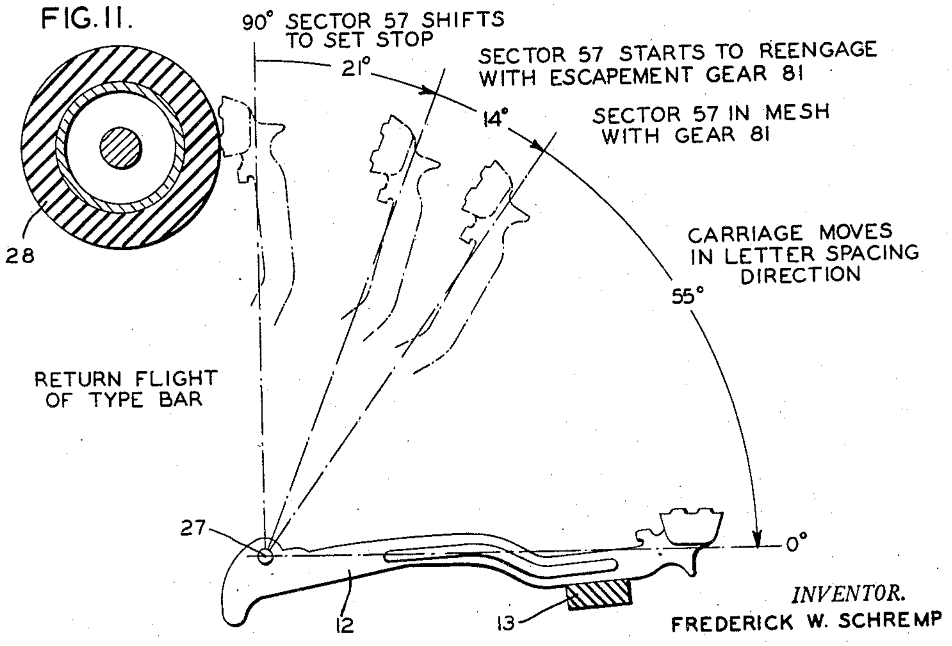
Fig. 11 is a view similar to Fig. 10 but showing the timing for the escapement mechanism in connection with return flight of a type bar.

10 and 11. The forward flight of any type bar 12 is graphically shown in Fig. 10 and the return flight of such bar is shown in Fig. 11.

Starting with the assumption that all of the type bars are in their normal rest position upon the type bar cushion 13, and that the type segment 7 is in lower case type position, depression of any typing key, for example the typing key for character key "L," and movement of carriage 6 in response to such key depression will now be described with particular reference to Figs. 2, 10 and 11. Upon depression of key lever 4 for typing key "L," its associated power arm 3 is tripped thus engaging eccentric 29 with the rotating power roll 5 to rock said arm on its pivot 16 in the manner heretofore explained. This clockwise rocking of power arm 3 simultaneously rocks its corresponding bell crank 19 clockwise, on pivot rod 20, causing forward flight of type bar 12 and setting the index mechanism for gear segment 57 which in this instance is stop bar 56. During the first portion of the forward flight of type bar 12, for example 55° as shown in Fig. 10, counterclockwise movement of bell crank 34 will draw slide 39 forwardly in the machine causing its lower case lug 145 to engage and rock bail 38 counterclockwise, which in turn elevates stop 56 to position the vertical working edge of its lug 76 into the path of pin 79 on gear sector 57. When type bar 12 has thus travelled approximately 55°, from rest position toward printing position, stop 56 has been set and sector 57 then starts to descend or be withdrawn from meshing engagement with gear 81. Fixed dog 123 starts into mesh with gear 81 as sector 57 starts to be withdrawn from mesh with said gear. When the type bar 12 has moved approximately 69°, toward platen 28, sector 57 is free from gear segment 57 and dog 123 is fully meshed with said gear 81. This prevents carriage movement in letter spacing direction during the time sector is free from the gear. Sector 57 is fully withdrawn from meshing engagement with gear 81 when roller 127 reaches the dwell portion 126ª on arm 126, and the sector is then free to rock clockwise on pivot 106 under the influence of spring 108 until its pin 79 is arrested by lug 76 of the elevated stop 56. This clockwise movement of sector 57 (as viewed in Fig. 6) represents two units of space and a corresponding movement is imparted to paper carriage 6 after the sector is remeshed with gear 81 and dog 123 is removed from holding engagement with said gear.

It will now be clear from Fig. 10 that approximately 21° of type bar movement during its forward flight, and 21° of movement at the beginning of its return flight (Fig. 11) is utilized as a dwell period for sector 57 to rock clockwise and settle against lug 76 of stop bar 56. During the next 14° of return flight movement of type bar 12, sector 57 is remeshed with gear 81. During the next 55° of type bar movement, toward normal rest position (Fig. 11), carriage 6 moves two units in letter spacing direction and is then stopped by sector 57 engaging stud 119. Latch 110 is restored to latching position relative to tooth 111 towards the end of counterclockwise movement of sector 57.

From the foregoing description it will now be understood that for each depression of a key lever 4, sector 57 will be disengaged from gear 81, rocked clockwise variable extents depending upon which of the stops 54, 55 and 56 are elevated, subsequently moved back into meshing engagement with gear 81 and then rocked counterclockwise until it is stopped by stud 119. Stating it another way, letter spacing movement of the paper carriage takes place during counterclockwise rotation of sector 57 and the further the sector is displaced from its normal home position against stop 119, by selective elevation of stops 54, 55 and 56, the further the carriage will move upon restoration of said sector.

As in conventional typewriters, carriage movement in response to depression of the space bar is not initiated through the type bar universal bar 138 since none of the type bars are put into flight by a space bar depression. In the illustrative machine, depression of the usual space bar 150 (Fig. 1) trips an associated power arm 3 and the bellcrank 19 for this power arm is not provided with a permutation slide 30 but instead trips the escapement through a pull wire 151 now described with particular reference to Fig. 9. The rear end of pull wire 151 is pivotally connected to the lower end of an arm 152 which is fixed to a transverse shaft 153 suitably journaled in the machine. Also fixed for rotation with shaft 153 is a U-shaped member 154 having spaced downwardly projecting legs 155 and 156. Leg 155 cooperates with an ear 157 projecting from link 139 (Fig. 9) when pull wire 151 is drawn forwardly in the machine and leg 156 simultaneously cooperates with an ear 158, projecting sidewardly from a two-arm lever 159, the lever being journaled on a shaft 160 supported by bracket 161 mounted upon frame back plate 8 by screws 162. The other end of the two-arm lever 159 carries an adjusting screw 163 which is mounted beneath an ear 149 formed upon the index stop 56. It will now be understood that when space bar 150 is depressed to trip its power arm 3 its corresponding bell crank 19 will be rocked clockwise in Figs. 1 and 2 to draw link 151 forwardly. This in turn, through arm 152, rocks shaft 153 and the U-shaped member 154 counterclockwise in Fig. 9 whereupon leg 155 moving against ear 157 pulls link 139 forwardly in the machine and said link rocks the escapement rocker 124 counterclockwise in the same manner as previously explained in connection with rocking movement of the universal bar. For each depression of the space bar 150 the paper carriage is moved two units in letter spacing direction and this necessitates elevating the two-unit stop bar 56 to position its lug 76 within the path of pin 79 on sector 57. In this instance the stop bar 56 is elevated by the two-arm lever 159 which is rocked clockwise through leg 156 on the U-shaped member 154.

As previously mentioned the arbitrary unit of space employed in the illustrative machine described herein for the purpose of proportionally spacing typed characters in accordance with their widths, is .03215 but the smallest space allotted to any printed character is twice this amount. Provision is therefore made for back spacing the carriage one unit for each depression of the usual back space key 164. Thus, to back space the carriage after a lower case "*t*" or any other two unit character is typed, two depressions of the back space key are necessary, and when a lower case "*k*," upper case "J" or any other three unit character is typed three depressions of the back space key will then be necessary to reversely move the carriage an amount equal to its travel in letter spacing direction in response to any three unit character typed. In other words, in the illustrative machine it is necessary to depress the back space key from two to five times depending upon the width of the character desired to be back spaced.

Figures 7, 8, 9:
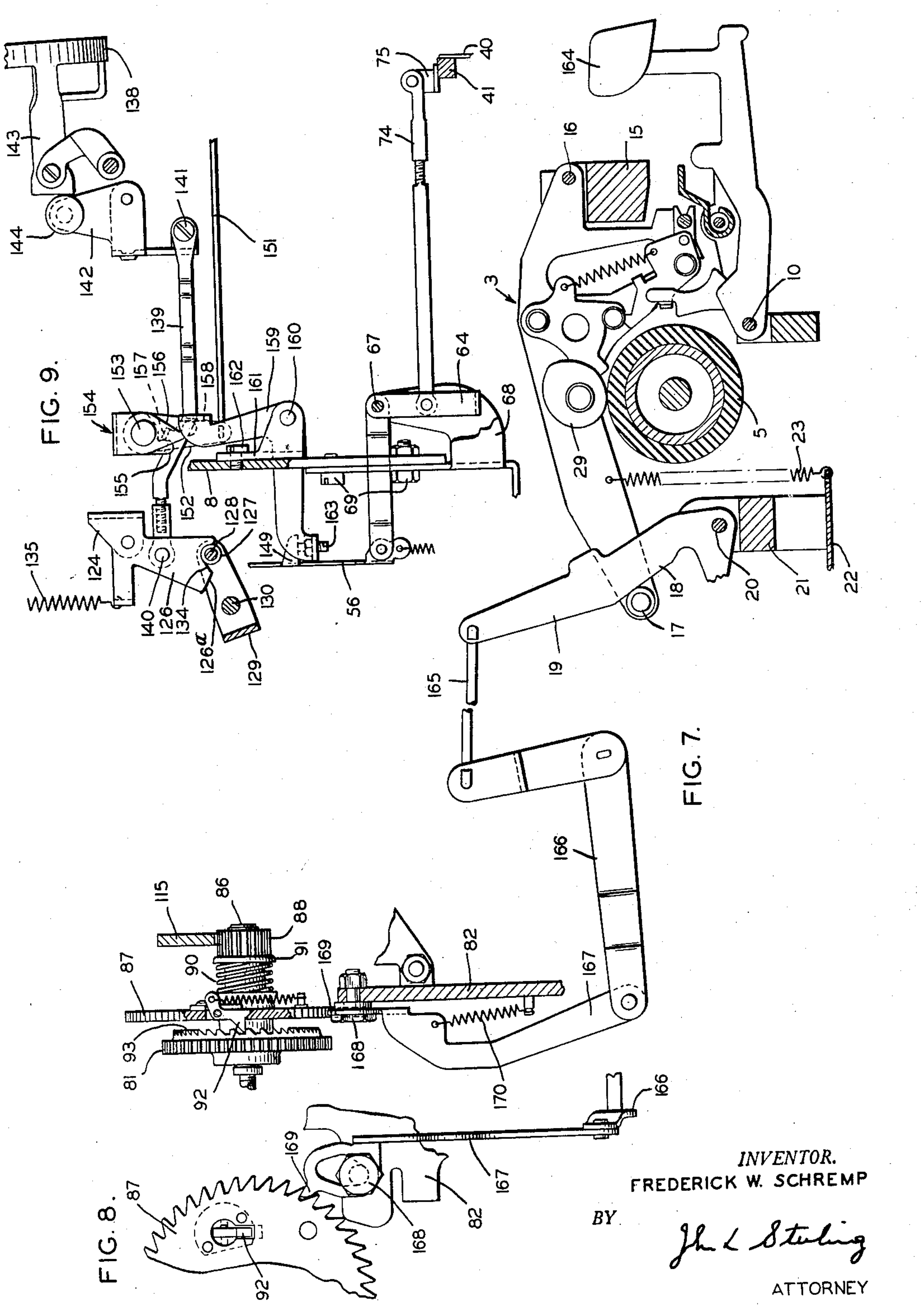
Fig. 7 is a detailed view in side elevation showing the backspace mechanism in normal position and its association with the backspace ratchet.
Fig. 8 is a fragmentary rear elevational detail of the backspace pawl and ratchet as it will appear during a backspace operation.
Fig. 9 is a side elevational detail of the chain of parts controlled by the space bar when operating the variable escapement mechanism through depression of said bar.

When back space key 164 is depressed, its associated power arm 3 (Fig. 7) is caused to operatively engage power roll 5 with the result that bell crank 19 is rocked clockwise. This draws link 165 forwardly in the machine or to the right in Fig. 7 and through bell crank 166, elevates back space pawl 167. The upper apertured end of pawl 167, as shown in Figs. 7 and 8, is guided by a headed stud 168 mounted in supporting bracket 82 and has a tooth 169 shaped to mesh or enter between any two adjacent teeth of back space ratchet 87. The construction is such that for each depression of back space key 164, pawl 167 will be raised or elevated to engage its tooth 169 between two adjacent teeth of ratchet 87 and thereafter rotate said ratchet counterclockwise on shaft 86 a distance equal to one unit space, and as a result, the carriage is reversely moved one unit of space or a distance equal to .03215. During the return stroke of pawl 167, under the influence of spring 170, dog 92 wipes idly over one tooth of ratchet 87. It will be noted that this reverse movement of back space ratchet 87 does not move escapement gear 81 which is being held against movement by pawl 110 previously described due to the wiping action of the dog 92 relative to the teeth 93 of said gear.

As previously stated the variable spacing mechanism of the present invention is designed to fully cooperate with the usual and well known tabulating mechanism. To this end, depression of the usual tabulating key (not shown) initiates a power arm operation to draw link 171 (Fig. 1) forwardly in the machine. The rear end of this link is connected to one arm of a bell crank 172 which pivots about stud 173. The other arm of bell crank 172 rocks pivoted lever 102 through the usual tabulating linkage, partly shown at 174, to disengage back space ratchet 87 and clutch dog 92 from the ratchet teeth 93 on the face of the escapement gear 81. During this operation the conventional tab stop blade assumes a latched position in the path of the set tabulator stop thereby releasing the carriage for free travel in letter spacing direction until the tabulator stop contacts and releases the latch of the tabulator stop blade. At this time the tabulator mechanism is restored to normal position allowing the clutch dog 92 to re-engage the ratchet teeth 93 on escapement gear 81.

Figure 13:
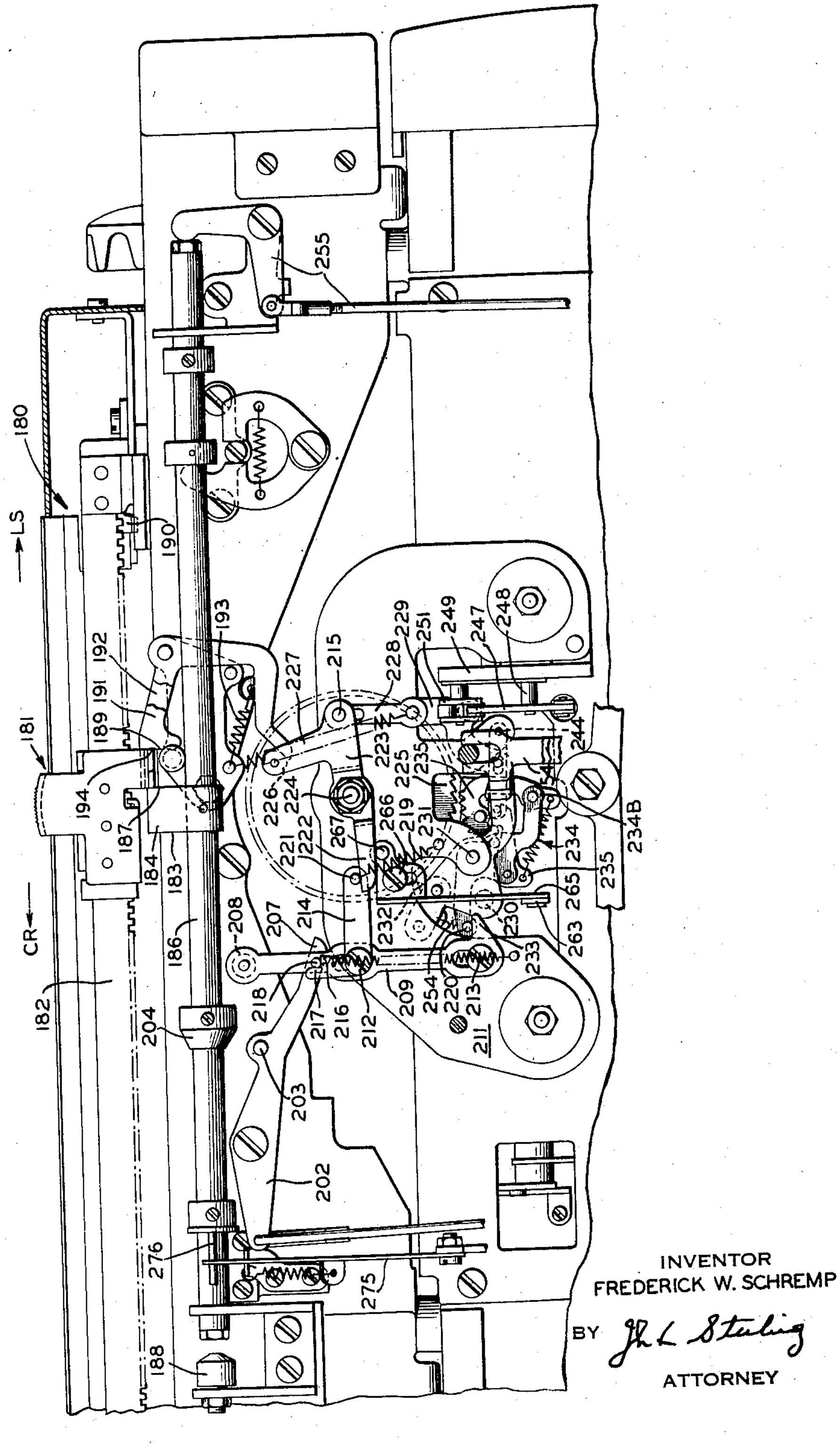
Fig. 13 is a fragmentary view, in rear elevation, of the machine shown in Fig. 1 in which a form of proportional letter spacing mechanism is shown in conjunction with a left hand margin stop.
Figure 14:
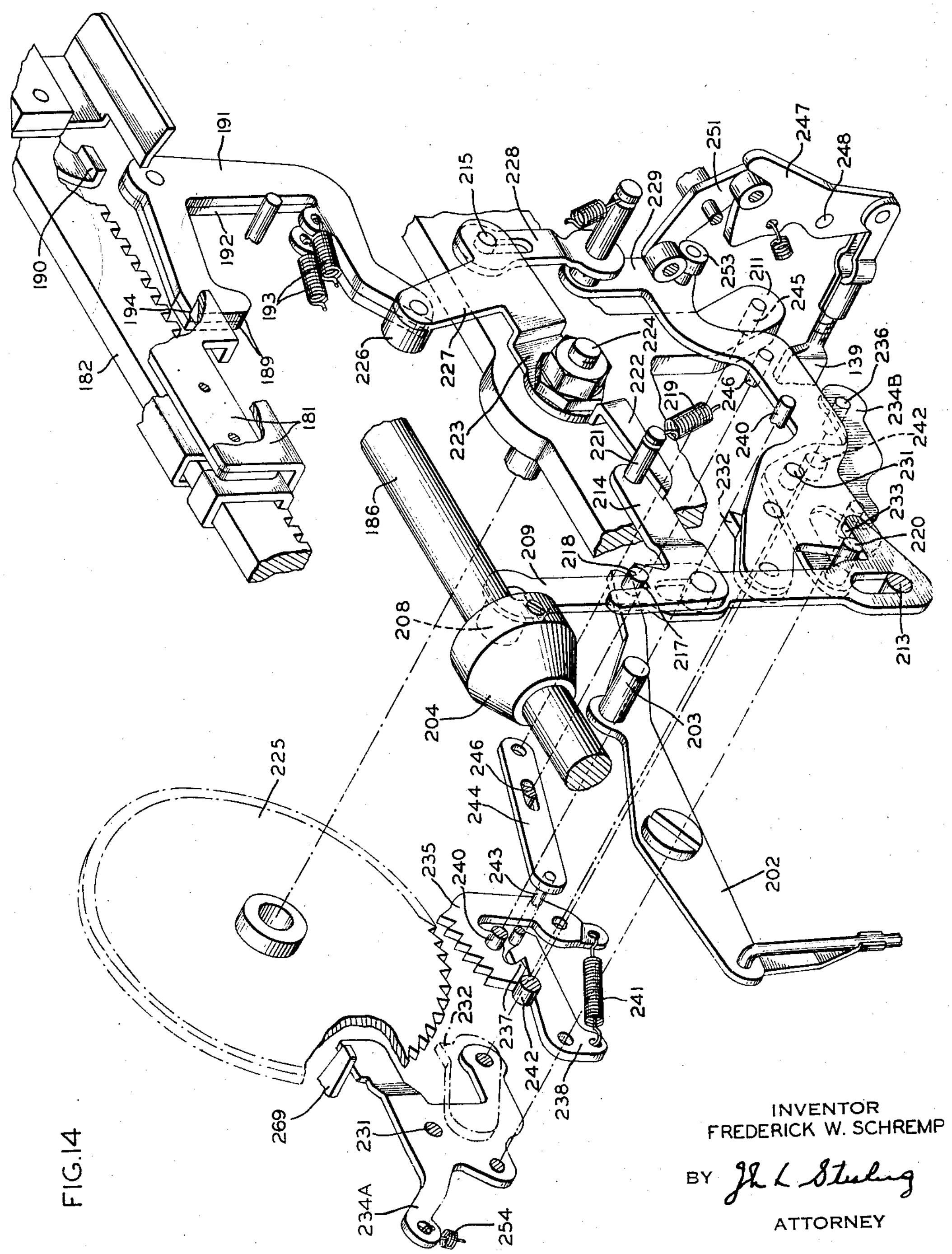
Fig. 14 is an exploded view of the proportional spacing mechanism of Fig. 13 shown in perspective.
Figure 16:
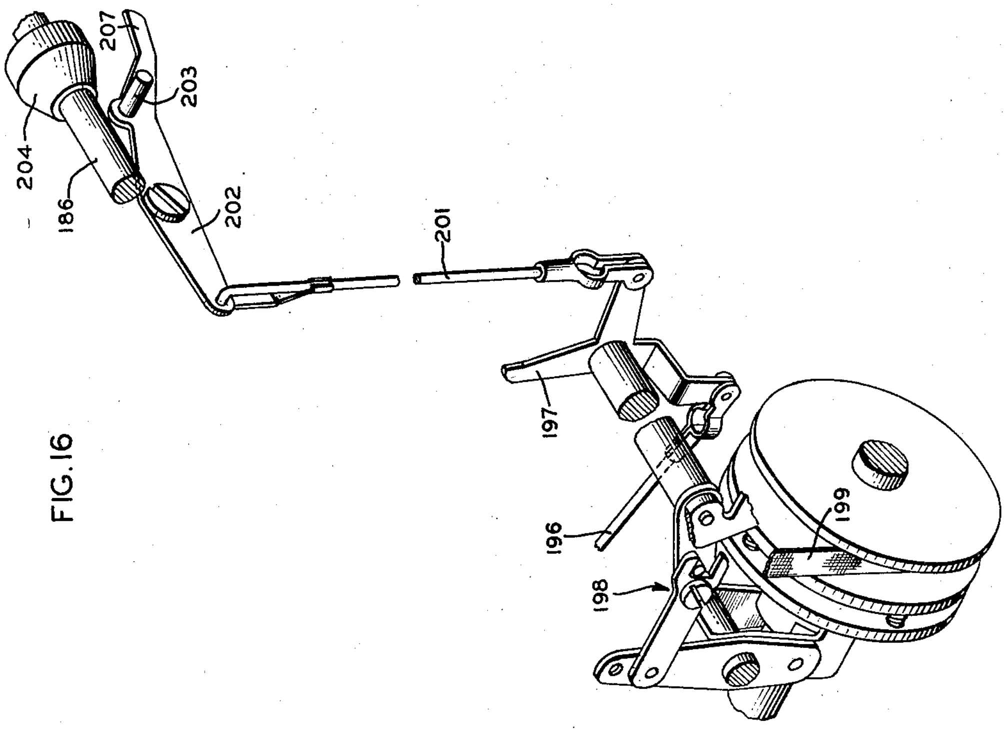
Fig. 16 is a view in perspective of parts of the clutch control employed in operation of the mechanism as shown in Fig. 13.
Figure 15:
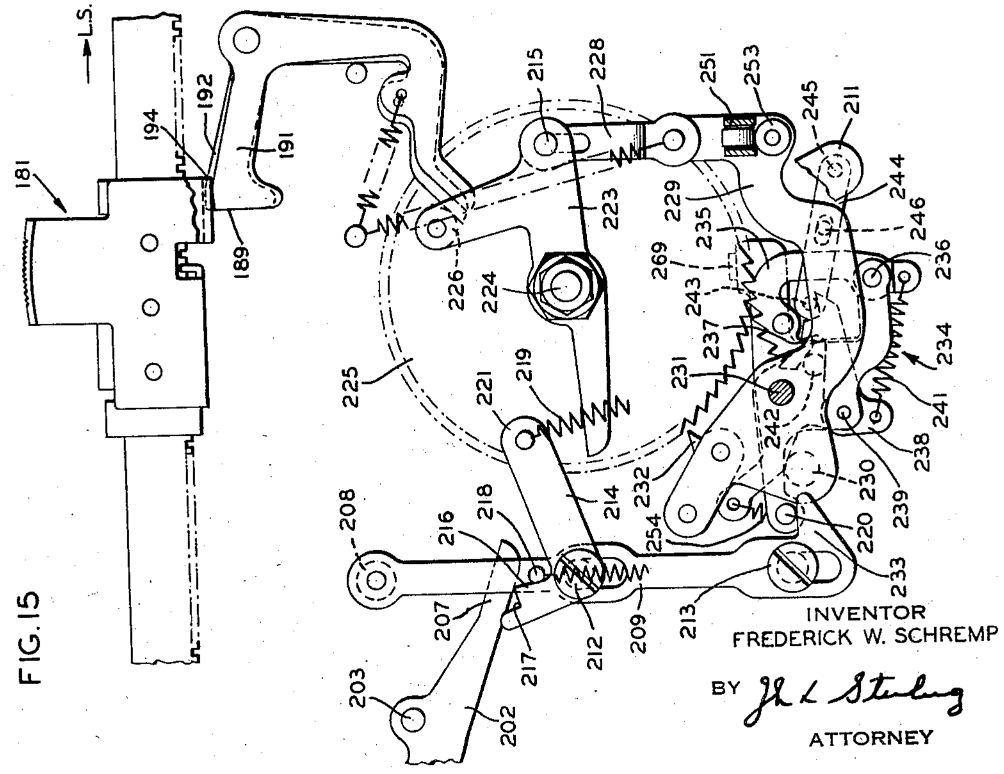
Fig. 15 is an enlarged view in rear elevation of the spacing mechanism and margin stop combination shown in Fig. 13.
Figures 17, 18:
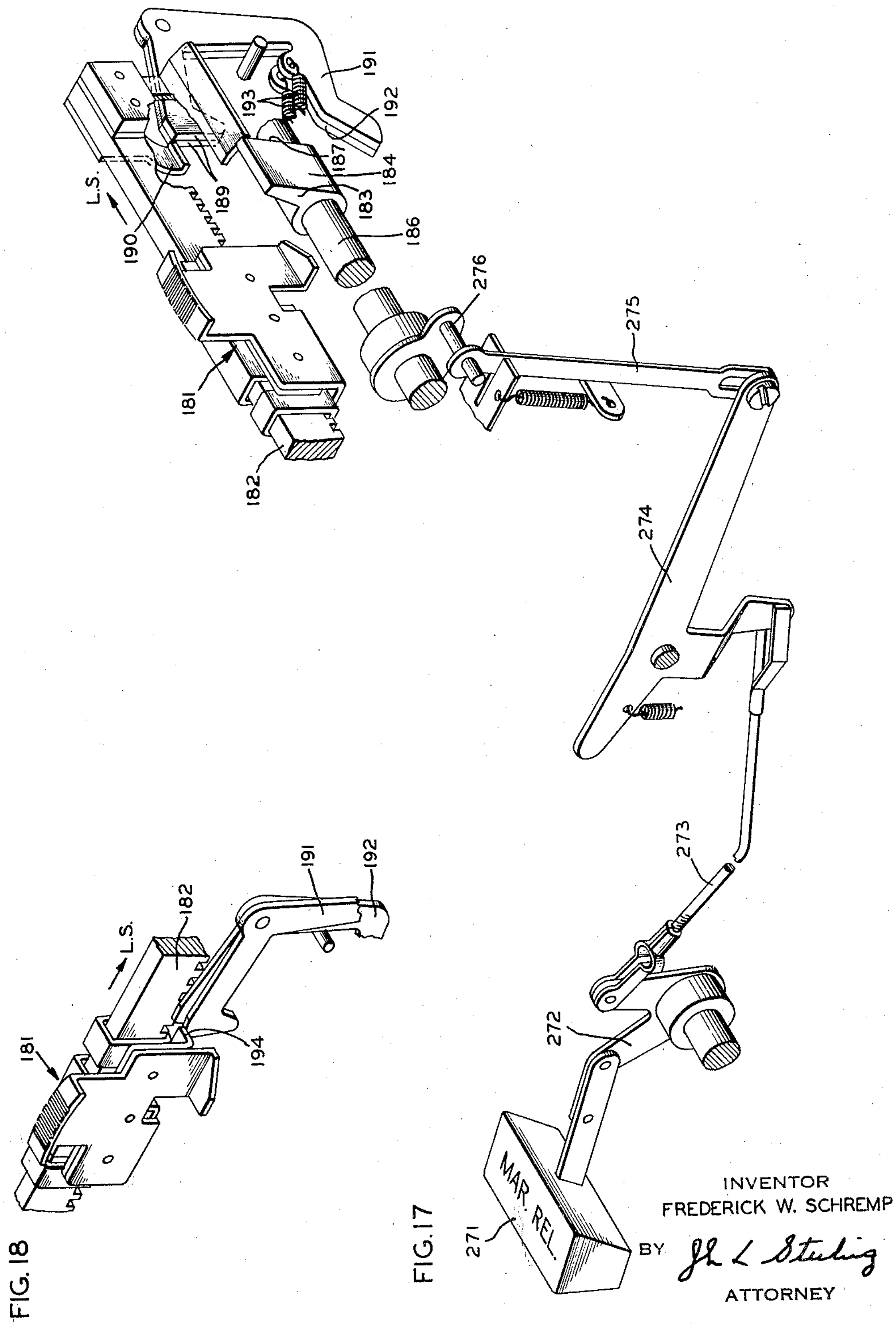
Fig. 17 is a view in perspective of the margin release mechanism as used with the margin control means.
Fig. 18 is a view in perspective showing the operating relation of the margin control means and the carriage control stop member.

Referring to the form of the invention shown in Figs. 13 to 21, the return of the spring urged carriage 180 toward the left in Fig. 13 is limited by the left hand margin stop 181 which is adjustable to any desired position on the carriage stop rack 182. When a line of typing has been completed the movement of the carriage is arrested by the usual right hand margin stop, not shown, abutting one side face 183 of a margin release dog 184 secured to a margin release rock shaft 186. When the usual carriage return key of the machine is operated, the margin stop 181 strikes the opposite face 187 of the dog 184 and thrusts the shaft 186 toward the left against a rubber bumper 188 so that the shaft, on its rebound movement, causes the stop 181 to forcibly engage the stop face 189 of a pawl 191, being one of two identically shaped pawls 191 and 192, which the stop 181 overrode, against the resistance of its spring 193, in its return travel. The control of the left hand margin is established accurately through the holding action of the adjustable margin stop pawl 191 with which the surface 194 of the adjustable margin stop 181 engages as the margin stop rebounds, to the right in Fig. 13, due to the action of the buffer 188 and the urge of the spring used in feeding the carriage in letter printing direction. The margin stop 181 is adjustable on the rack 182 and is effective at any setting. A fixed left hand margin stop 190 secured to the carriage stop rack 182 coacts with the fixed margin stop pawl 192 in like manner.

The combination of margin stop control means as here employed to hold the escapement wheel, when a sector and dog such as 57 and 123, respectively, are released therefrom and no holding ratchet means are employed, is of a novel nature, reduces the number of parts heretofore necessary and provides for the precise marginal stopping position of the carriage so that the left edge of the first letter typed after carriage return will be in exact vertical alignment with the left edges of the other characters at the same margins. In Fig. 13 which is a rear view, the carriage has been returned, the margin stop 181 has overridden the margin pawl 191 and the stop face 189 of the latter is engaged by the surface 194 of said stop. To accomplish carriage return the usual carriage return key is depressed and the power mechanism, through a link 196 (Fig. 16) and a clutch toggle 197, engages a clutch mechanism 198 to return the carriage by a pull on the belt 199 all as well understood in the electric typewriter art. The clutch toggle 197 through a pull wire 201 rocks a clutch toggle release lever 202 which is suitably pivoted to a part of the frame and carries a pin 203 for overriding engagement by a clutch toggle release cam 204 on the margin release shaft 186.

When the carriage return key is pressed the free end 207 of the toggle release lever 202 (Fig. 13) rises and engages a stud 208 on the upper end of a lift link 209 to raise the latter in sliding movement on the rocker bracket 211 on which it is guided by upper and lower pin-in-slot members 212 and 213 respectively. The upper member 212 provides a pivot for a bell crank latch 214 having a shoulder 216 and a notch 217 into the latter of which rides, over the shoulder 216, a pin 218 carried by a link 209 as the latter rises.

As the pin seats in the notch a spring 219 swings the bell crank 214 clockwise so that its pin 221 overlying the free end 222 of a pawl bell crank 223 rocks the latter counterclockwise pivotally on a shaft 224 which also carries the escapement wheel 225. As the bell crank 223 rocks, a pawl camming stud 226 on one arm 227 thereof allows the pawls 191 and 192 to rise at their margin stop engaging ends under urge of springs 193, so that, as the margin stop 181 rides thereover in carriage returning movement, the pawls provide stop means against which said margin stop limits in reverse movement, as explained above, to accurately establish the left margin. This is the position of the parts depicted in Fig. 13. When the bell crank 223 was rocked, by the rising action of link 209, it was free to swing by reason of its pin-and-slot connections 215 with the upper end of a link 228, pivoted to one end of a detent lever 229. The latter, as will be later explained, is in a counterclockwise position, about its pivot stud 231 in bracket 211, and maintains a detent dog 232, fixed to said lever, out of engagement with the teeth of the escapement wheel 225. At the same time the lift of link 209 through a toe portion 233 thereon, engaging a carrier pin 220 in one end of a sector carrier or holder 234 that normally rests on a stud 230 in the lever 229, rocks the sector carrier or holder which is also pivoted on stud 231. The holder 234 which comprises spaced plates or supports 234A and 234B, swings in clockwise direction to lower a toothed sector 235 pivoted therebetween as at 236, to disengage the teeth of the sector from the wheel 225. The latter is then free to revolve as the carriage is returned by its clutch operated belt 199. The sector is provided at one end with an under tooth notch 237 for engagement by a sector latch 238 pivoted as at 239 to the holder 234 and having trigger relation with the sector through a common spring 241. The swinging movement of the sector and its latch in one direction is limited by a stud 242 in a face of the carrier. The latch is adapted to be released by a latch pin 243 in one end of a latch release lever 244 which is fulcrumed at its other end as at 245 to an ear of the bracket 211 and pivoted intermediate its ends as at 246 to the detent lever 229 to provide a lever of the third class. As shown in Fig. 13 the sector and the dog 232 are free of the wheel and the pawl 191 is holding the carriage at left margin position through stop 181. The use of the word carrier herein is intended to include the sector support pieces 234A and 234B as well as the detent lever 229.

Figure 20:
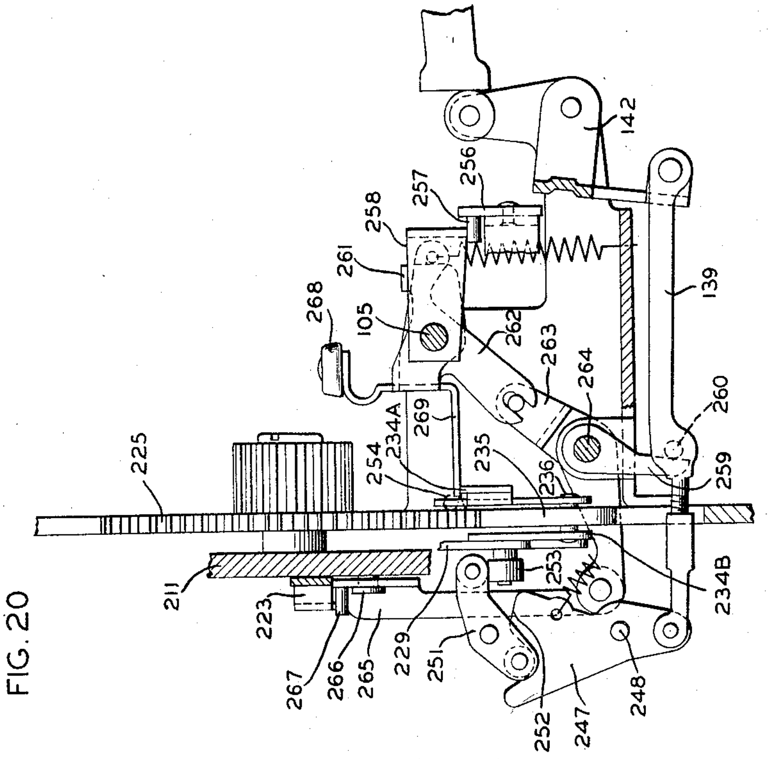
Fig. 20 is a side view of the mechanism shown in Fig. 19.
Figure 19:
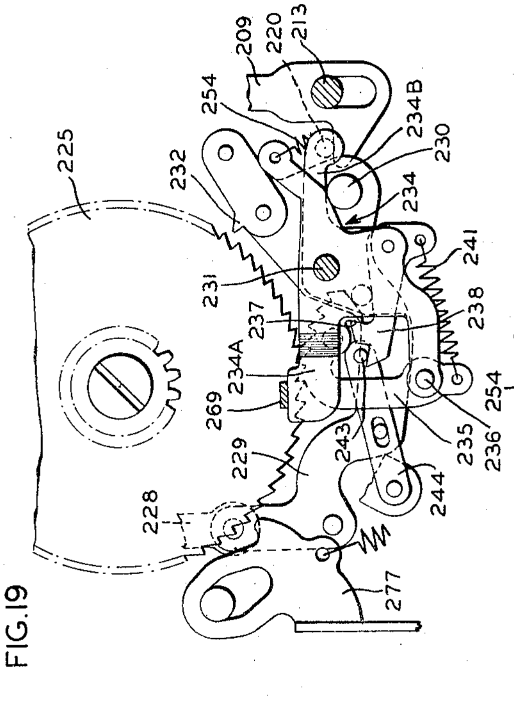
Fig. 19 is a detail view of the mechanism as seen from the front of the machine.
Figure 21:
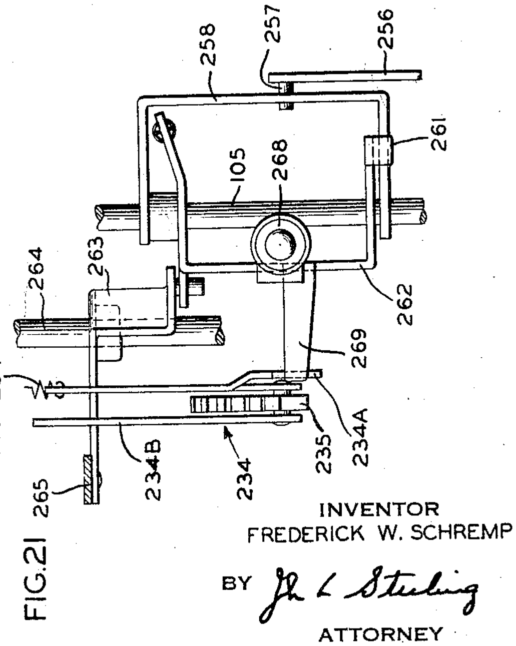
Fig. 21 is a fragmentary plan view of the mechanism shown in Fig. 20.

When the first character key is pressed and the power mechanism throws the type bar, the corresponding index stop is set, and through the universal bar 138, Fig. 1, the universal bar oscillator 142 is rocked to pull on the link 139 and swing the escapement rocker cam 247, Fig. 20, counterclockwise about its pivot 248 on a bracket 249, Fig. 13. The latter also pivotally supports a cam follower lever arm 251 whose free end has roller engagement with a cam surface 252 on the upper face of rocker 247 and whose opposite end has roller engagement with a bearing stud 253 on the end of the detent lever 229 that is connected to the detent link 228. Operation of the cam swings the detent lever clockwise to cause like movement of pawl bell crank 223, Fig. 15; retract movement of the pawls 191, 192 to free the carriage for spacing movement; and release movement of bell crank 214 to push the shoulder 216 from beneath the pin 218, and allow the link 209 to be pulled down by its spring. The movement of lever 229 causes the dog 232 to engage the wheel 225 before the carriage is released by the pawl 191, and also through pivot 246 swings the latch lever 244 down to disengage the latch 238 from the sector. The latter, under influence of its spring 241, is then swung until its pin 240 (Fig. 15) limits against the stop corresponding to the character being typed, and as the rocker cam 247 returns to its normal position, as shown in Fig. 20, counterclockwise movement of detent lever 229 ensues. The stud 230, when it lowers, due to counterclockwise swing of the detent lever, permits a spring 254 to rock the sector carrier and bring the teeth of the sector into mesh with the teeth of the escapement wheel and to release the dog 232 from the wheel so that under carriage pressure the sector moves in counterclockwise direction to abut the stud 242 and arrest the carriage movement at a point defining the space allotted to the letter or character being typed.

In the letter space action of the mechanism, during normal typing, the first swing of the rocker cam 247 rocks the detent lever 229 clockwise to engage the dog 232 with the wheel 225 and, through stud 230, rocks the carrier 234 in the same direction to disengage the sector from the wheel for spring urged impingement against the selected increment stop. The reverse swing of the rocker cam 247 allows the carrier to swing counterclockwise so that the spring 254 holding the carrier against the lowering stud 230 causes the sector to engage the wheel and be returned against the limit stud 242 during letter space movement of the wheel as the dog 232 releases the same for rotation under carriage pressure. When carriage return is inaugurated the sector 235 is withdrawn from the wheel through link 209 as above described and upon the first character key action the index stop is set and in succeeding key actions the operation of the parts is as shown in Figs. 10 and 11. When a line of typing is finished and the right margin stop strikes the face 183 of the dog 184, the longitudinal movement of the shaft 186, to the right, in Fig. 13, operates the line lock control member 255 to lock the keys against further operation.

In tabulating operations it is necessary to release the sector 235 from holding engagement with the escapement wheel 225 without causing the dog 232 to act as a detent in the operation of said wheel. When the tabulator key lever is actuated, its power mechanism, through the usual tabulator bell crank 256 and pin 257 shown in Fig. 20, rocks a tabulator release bail 258 pivoted on shaft 105. Upward swing of the bail 258, through an overlying ear 261 formed on a carriage release rocker 262, rocks the latter on shaft 105 to swing a lift lever 263 clockwise on a space shaft 264 to raise a vertical lift link 265. The space shaft 264, which is rocked by operation of a space bar in a well known manner, also carries a depending space dog 259 which, through a pin 260, actuates the link 139 to provide a spacing movement of the carriage. The link 265 has a bolt-in-a-slot connection 266 to the bracket 211 and at its upper end has a pin 267 underlying the pawl bell crank 223. The release rocker 262 carries a roller 268, for actuation by the manually controlled carriage release bail 100 (Fig. 1), and an extension 269. The sector carrier 234 as before noted consists of two spaced carrier supports or plates 234A and 234B mounted on the pivot stud 231 and arranged to hold between them the sector 235 and its control latch 238 on their pivot pins 236 and 239 respectively. The extension 269 overlies the upper edge of the support 234A so that when the tabulator key is actuated the downward movement of the supports by the extension 269 will withdraw the sector from holding mesh with the escapement wheel. In this manner the detent dog 232 will not engage the wheel because operation of the supports 234A and 234B is independent of the movement of the detent lever 229 which movement is accomplished by the action of the escapement rocker cam 247.

When the adjustable margin stop 181 is being employed to define one left margin, the fixed left margin stop 190 can be used also to define another left margin by manual operation of the margin release key 271 (Fig. 17) which, operating through a train of parts including a key lever bell crank 272, a tie rod 273, a T lever 274 and a link 275 rocks the margin release shaft 186, through a pin and collar connection 276, to throw the margin release dog 184 out of the way so that the margin stop 181 is released and the stop 190 can limit against the pawl 192. At the start of typing from the left margin position the pawls 191 and 192 are drawn down to allow the carriage to step in letter space direction as above explained. Backspace movement of the carriage is done by a backspace dog 277 (Fig. 19) which directly engages the wheel which, due to the rake of its teeth, ratchets over the sector and the correct spacing is held thereby.

If desired, the space bar 150 can be divided and used to operate the permutation unit to differentially space the words of a line for justification of the lines of a page of typing.

While the invention has been described with particular reference to the structural embodiment shown, it is not confined to details herein disclosed, and this application is intended to cover all modifications or departures coming within the purposes of the improvement or the scope of the following claims:

What I claim as new and desire to secure by Letters Patent is:

1. In a typewriter or like printing machine having a movable carriage, variable feed mechanism for the carriage comprising: a plurality of depressible keys; a series of type bars actuated upon depression of their corresponding keys; a rotatable escapement gear; separable driven connections between said carriage and gear; a carrier, a spring biased escapement sector pivoted to the carrier and disposed in coplanar relation to said gear and normally engaged with said gear; means responsive to depression of said keys to disengage the sector from the gear in planar movement; index means selectively settable in response to depression of said keys to vary the extent of displacement of said escapement sector from a starting position after it has been disengaged from said gear; and means including said carriage to reversely move said sector and gear in unison upon re-engagement with one another until the sector has returned to said starting position to thereby restrict carriage movement, in letter spacing direction, an extent equal to displacement of said sector from said starting position.

2. In a typewriter or like printing machine having a movable carriage, a series of typing keys, and a plurality of type bars controlled by said keys, means for moving the carriage in letter spacing direction variable extents as determined by the widths of the characters printed by said type bars comprising: an escapement gear of a given pitch connected to and driven by said carriage; a toothed sector having the same pitch as said gear and disposed in coplanar relation to said gear and normally engaged therewith; a carrier to which said sector is pivoted under control of said keys acting to disengage said toothed sector from said gear in vertical movement during forward flight of said type bars; and means to move said toothed sector varying extents in one direction, and relative to said gear while disengaged therefrom, whereby upon re-engagement of said toothed sector in vertical movement with said gear said carriage is fed in letter spacing direction an extent equal to the movement of said toothed sector during the time it is disengaged from said gear.

3. In a typewriter or like printing machine having a series of type bars and depressible keys for initiating printing strokes of said bars, the combination of a movable carriage; means normally acting to drive said carriage in letter spacing direction; an escapement mechanism for controlling carriage movement variable extents proportional to the widths of characters printed by said type bars comprising; an escapement gear driven by said carriage; a spring biased gear sector arranged in coplanar relation with said escapement gear, a carrier for moving said sector out of and into meshing engagement with said gear in vertical direction; a fixed stop on the carrier limiting movement of said sector in one direction when in mesh with said gear; and a plurality of selectively settable stops under control of said keys to variably limit movement of said sector in a reverse direction and when it is out of engagement with said gear whereby movement of said carriage in letter spacing direction is proportional to movement of said sector in said reverse direction.

4. In a typewriter, the combination with a paper carriage spring urged in one direction from a left margin position, an escapement gear connected to said carriage for controlling the movement of the latter in said direction, means associated with said gear for varying the movements of the carriage in said direction in accordance with the widths of the printed characters, a margin stop on the carriage for defining said left margin position, and means for returning said carriage after a typing operation to the margin position defined by said stop; of detent pawl means for arresting the movement of said margin stop and the carriage at said margin position, and means controlled by the operation of said carriage return means for moving said pawl means into stop arresting position and disassociating said movement varying means from said escapement gear.

5. In a typewriter having a key mechanism, the combination with a paper carriage spring urged in one direction from a left margin position, escapement gear means connected to the carriage for varying the movements of the carriage in said direction in accordance with the widths of the printed characters, a margin stop on the carriage for defining said left margin position, and means for returning said carriage after a typing operation to the margin position defined by said stop; of detent pawl means over which said margin stop rides in return movement, means controlled by the operation of said carriage return means for setting said pawl means in stop arresting position, margin release means against which said stop has rebound engagement to abut said set pawl means at the margin position, and means controlled by operation of the typewriter key mechanism for moving said pawl means from stop detaining position.

6. In a typewriter having a key mechanism, the combination with a paper carriage spring urged in one direction from a left margin position, a margin stop on the carriage for defining said left margin position, means for returning said carriage after a typing operation to the margin position defined by said stop, and an escapement gear operatively connected to said carriage for controlling the movement of the latter in said direction; of means for varying the movements of the carriage in said direction in accordance with the widths of the printed characters including a toothed sector, a gear detent, a carrier for moving the detent and the sector alternately into and out of mesh with said gear, adjustable stops against which the sector swings in one direction when out of mesh with the gear and a fixed stop against which the sector swings in the opposite direction when in mesh with said gear to define a movement of the carriage, detent pawl means over which the margin stop rides in carriage return movement, means controlled by the operation of said carriage return means for setting said pawl means in stop arresting position and for moving said sector and detent out of mesh with said gear, margin release means against which said stop has rebound engagement to abut said set pawl means and hold the carriage at the margin position, and means controlled by operation of the typewriter key mechanism for moving the pawl means out of stop detaining position and the detent into gear engaging position.

7. In a typewriter having a key mechanism, the combination with a paper carriage spring urged in one direction from a left margin position, a margin stop on the carriage for defining said left margin position and means for returning said carriage after a typing operation to the margin position defined by said stop; of an escapement gear operatively connected to said carriage for controlling the movement of the latter in said direction, means coacting with said gear for varying the movements of the carriage in said direction in accordance with the widths of the printed characters, detent pawl means over which the margin stop rides in carriage return movement, means controlled by the operation of said carriage return means for setting said pawl in stop arresting position and for disabling said carriage movement varying means, margin release means against which said stop has rebound escapement to abut said set pawl means and hold the carriage at the margin position, and means controlled by the typewriter key mechanism for moving the pawl means out of stop detaining position and enabling said carriage movement varying means.

8. In a typewriter, the combination with a paper carriage spring urged in one direction from a left margin position, a margin stop on the carriage for defining said left margin position and means for returning said carriage after a typing operation to the margin position defined by said stop; of an escapement gear operatively connected to the carriage for controlling the movement of the latter in said direction, means coacting with said gear for varying the movements of said carriage in said direction in accordance with the widths of the printed characters including toothed sector means and gear detent means, detent pawl means for arresting the movement of said margin stop to locate the carriage at the left margin position, means controlled by said carriage return means for positioning said detent pawl means in stop arresting position including latching bell-crank means for moving the sector means and the gear detent means out of coactive relation with said gear, and key controlled means for actuating said latching means to restore said pawl means to non-arresting position and the gear detent means to coactive relation with said gear.

9. In a typewriter, the combination with a paper carriage spring urged in one direction from a left margin position, a margin stop on the carriage for defining said left margin position, and means for returning said carriage after a typing operation to the margin position defined by said stop; of an escapement gear operatively connected to the carriage for controlling the movement of the latter in said direction, means coacting with said gear for varying the movement of said carriage in said direction in accordance with the widths of the printed characters, said varying means including a carrier having a gear detent member, a stud, a sector normally in engagement with the gear and in contact with said stud to stop the carriage at the end of a varying movement, a catch for holding the sector in stud contacting position, and a catch lever for releasing said catch from holding engagement with the sector, pawl means for said margin stop, means controlled by said carriage return means for latching said pawl means in stop arresting position and for moving said carrier to disengage the sector from said gear whereby the pawl means holds the carriage at said margin position, and key controlled means for engaging said detent member with the gear to hold the carriage, for operating said catch lever to free the sector for movement independently of said gear, unlatching said pawl means for release of said margin stop and reengaging said sector with the gear to define a variable carriage movement.

10. In a typewriter having a key mechanism, the combination with a paper carriage spring urged in one direction from a left margin position, means for varying the movements of the carriage in said direction in accordance with the widths of the characters, a margin stop on the carriage, and means for returning the carriage after a typing operation toward the left margin position; of pawl means over which said stop passes in carriage return direction, means controlled by said stop after it passes said pawl for disabling said carriage return means, means controlled by said carriage return means for positioning said pawl in stop arresting position and for disabling said carriage movement varying means, and means controlled by operation of the typewriter key mechanism for moving said pawl means from stop arresting position and enabling said movement varying means.

11. In a typewriter having operating keys and a movable carriage normally urged in one direction, a proportional spacing device comprising an escapement gear operatively controlling the movement of the carriage; sector means including a swingable toothed sector normally engaged with said gear; key controlled means for moving the sector out of and into mesh with said gear; index means selectively settable by the keys to vary the extent of swing of the sector in one direction, when it is out of mesh with said gear; means for limiting the extent of swing of the sector in reverse direction when it is in mesh with the gear to define a spacing movement of the carriage in accordance with the width of the character being printed; detent means for engaging the gear to prevent movement of the carriage during an out of mesh swing of the sector during normal typing operation; means for moving the sector out of engagement with the gear while the detent means is out of engagement with said gear; and margin controlling means for holding said carriage against movement when said sector moving means is effective.

12. The invention set forth in claim 11 in which said sector means includes spaced carrier members having a pivot common to said detent means; a latch for holding the sector against said limiting means; means controlled by the movement of said detent means for releasing said latch; and a spring connecting the latch and the sector for swinging the latter away from said limiting means and urging the latch toward said sector.

13. The invention set forth in claim 11 in which said key controlled sector moving means includes an escapement rocker cam means for rocking said detent means; a carrier for said sector having a common pivot with said detent means; and a stud on said detent means for rocking said carrier.

14. The invention set forth in claim 11 in which said means for moving the sector out of engagement with the gear while the detent means is normally out of engagement with said gear includes a detent lever; a carrier for the sector comprising spaced support pieces having a common pivot with each other and with said detent lever; a carriage return link engaging one of the support pieces at one side of the pivot for rocking the carrier; and a carriage release means engaging the other of said support pieces at the opposite side of said pivot for rocking the carrier.

15. In a typewriter, the combination with an escapement gear for controlling the movement of a carriage, spring urged in letter spacing direction; of a pivoted sector carrier shaped to provide a dog for detent engagement with said escapement gear, an ear portion and a limit stop; a sector pivoted to said carrier for swinging movement and having gear teeth for mesh with the teeth of said escapement gear; a latch overlying said ear portion for holding the sector at the end of a swinging movement in one direction abutting said limit stop; space defining stop means for arresting the swinging movement of said sector in the opposite direction; means for adjustably positioning said space stop means in accordance with the operation of different groups of typing keys; spring means for normally urging the sector toward said space stops; and means for swinging said carrier in opposite directions about its pivot, first in a direction to lower said sector vertically to free the teeth thereof from the teeth of said escapement gear, to engage the dog with the escapement gear and to disengage the latch from holding engagement with the sector whereby the latter moves under influence of its spring means into engagement with a set space stop, and in a second direction to raise the sector into meshing engagement with the escapement gear, to disengage the dog from the escapement gear whereby the sector is swung from engagement with a space stop to abut said limit stop against the resistance of the sector spring by the operation of the escapement gear to define a letter space movement of the spring urged carriage and to lower said ear for engagement of the latch with said sector.

16. The combination as set forth in claim 15, in which said carrier swinging means includes a pivoted escapement rocker operated at each key stroke of the typewriter and shaped to provide a cam portion, a spring raised link depending from said carrier, and a roller on said link in operating engagement with said cam to lower the link.

17. The combination as set forth in claim 15, in which said means for adjustably positioning said space stop means includes permutation means controlled by operation of the typewriter keys, bails connecting the permutation means and said space stop means for raising the latter selectively, one of said stop means having an ear portion, and space bar control means for engaging said ear portion for actuating the associated stop independently of said stop positioning permutation means.

18. In a typewriter or like printing machine having a movable carriage normally urged in one direction, a key mechanism, variable spacing mechanism for the carriage comprising an escapement gear operatively controlling the movement of the carriage, a carrier adjacent the periphery of the gear pivoted for rocking movement radially toward and away from the periphery of said gear, arm portions on the carrier extending from the pivot point thereof, a limit stud on the carrier, a gear segment pivoted to one of said arms and disposed in coplanar relation to said escapement gear and biased for free swinging movement in one direction, said carrier being controlled by the key mechanism for rocking operation to move said gear segment radially out of and into mesh with said escapement gear, an indexing mechanism operable by said key mechanism, a plurality of stop means selectively settable by the indexing mechanism, a pin on the segment for engagement with said stop means in set and non-set position, said segment moving in one direction out of mesh and coplanar with said escapement gear against the stop means to define a letter space and moving in the opposite direction in mesh and coplanar with said escapement gear to abut said stud and limit the movement of the carriage in proportion to the letter space defined by the free movement of said segment, and latch means for detaining said segment in stud engaging position and said latch means being movable, upon operation of said carrier, away from said escapement gear to release said segment for free swinging movement.

19. In a typewriter or like printing machine having a movable carriage normally urged in one direction, a key mechanism, variable spacing mechanism for the carriage comprising an escapement gear operatively controlling the movement of the carriage, a pivoted carrier adjacent the periphery of said gear, arm portions on the carrier extending from the pivot point thereof, a limit stud on the carrier, a gear segment pivoted to one of said arms and biased for free swinging movement in one direction, said carrier being controlled by the key mechanism for rocking operation to move said gear segment out of and into mesh with said escapement gear, an indexing mechanism operable by said key mechanism, a plurality of stops selectively settable by the indexing mechanism, said segment moving in one direction out of mesh with said gear against a selected stop to define a letter space and moving in the opposite direction in mesh with said gear against said stud to limit the movement of the carriage in proportion to the letter space defined by the free movement of said segment, a pawl defining a left margin position, a stop on the carriage, means for returning the carriage after a typing operation to said left margin position, and means associated with said pawl and controlled by the operation of said carriage return means for disabling said variable spacing mechanism and moving said pawl into stop arresting position to hold said carriage at said margin position.

20. In a typewriter having a movable carriage, a plurality of manually operable keys and a series of type bars each actuated upon depression of its corresponding key, mechanism for moving the carriage variable extents proportional to the width of the characters printed by said type bars comprising: an escapement gear; separable driven connections between said gear and carriage; an escapement gear sector normally engaged with said escapement gear; means including a carrier having a stud defining a starting position responsive to depression of said keys to disengage said escapement gear sector from said escapement member and subsequently re-engage them; index means selectively settable in response to depression of any of said keys to vary the extent of displacement imparted to said gear sector during the time it is disengaged from the escapement gear; means for moving said gear sector from said starting position during the time it is disengaged from said escapement gear, engagement means to return said sector to said starting position in engagement with said escapement gear whereby the carriage is moved in letter spacing direction during the return of said gear to its starting position; a pawl, a stop coacting with said pawl and adjustable on the carriage to define selected left margin positions of said carriage, means for returning the carriage in said left margin direction after a typing operation, and means associated with said pawl and controlled by the operation of said carriage return means for disengaging the escapement gear sector from the escapement gear and moving said pawl to stop arresting position.

21. The invention set forth in claim 20 including a pawl defining a left margin position, a stop on the carriage, means for returning the carriage after a typing operation to said left margin position, and means associated with said pawl and controlled by the operation of said carriage return means for disabling said variable spacing mechanism and moving said pawl into stop arresting position to hold said carriage at said margin position.

References Cited in the file of this patent

UNITED STATES PATENTS

| | | |
|---|---|---|
| 344,933 | Baldrige et al. | July 6, 1886 |
| 2,111,410 | Stockney | Mar. 15, 1938 |
| 2,167,812 | Muller | Aug. 1, 1939 |
| 2,202,565 | Reid | May 28, 1940 |
| 2,385,036 | Smathers | Sept. 18, 1945 |

FOREIGN PATENTS

| | | |
|---|---|---|
| 782,987 | France | July 5, 1935 |